US008209738B2

(12) United States Patent
Nicol et al.

(10) Patent No.: US 8,209,738 B2
(45) Date of Patent: Jun. 26, 2012

(54) ANALYSIS OF DISTRIBUTED POLICY RULE-SETS FOR COMPLIANCE WITH GLOBAL POLICY

(75) Inventors: David M. Nicol, Urbana, IL (US); William H. Sanders, Mahomet, IL (US); Sankalp Singh, Champaign, IL (US); Mouna Seri, Redmond, WA (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 798 days.

(21) Appl. No.: 12/128,445

(22) Filed: May 28, 2008

(65) Prior Publication Data

US 2008/0301765 A1     Dec. 4, 2008

Related U.S. Application Data

(60) Provisional application No. 60/941,132, filed on May 31, 2007.

(51) Int. Cl.
*G06F 17/00* (2006.01)
*H04L 29/06* (2006.01)
(52) U.S. Cl. ............... 726/1; 726/25; 709/224
(58) Field of Classification Search .................. 726/1, 25
See application file for complete search history.

(56) References Cited

U.S. PATENT DOCUMENTS

| | | | | |
|---|---|---|---|---|
| 6,839,754 | B2* | 1/2005 | Nowak et al. | 709/224 |
| 7,139,242 | B2* | 11/2006 | Bays | 370/238 |
| 7,392,544 | B1* | 6/2008 | Pavlyushchik | 726/24 |
| 7,536,456 | B2* | 5/2009 | Williams et al. | 709/224 |
| 7,665,119 | B2* | 2/2010 | Bezilla et al. | 726/1 |
| 7,849,497 | B1* | 12/2010 | Hurst et al. | 726/1 |
| 8,024,772 | B1* | 9/2011 | Yehuda et al. | 726/1 |
| 2005/0008001 | A1* | 1/2005 | Williams et al. | 370/352 |
| 2006/0242703 | A1* | 10/2006 | Abeni | 726/23 |
| 2007/0061125 | A1* | 3/2007 | Bhatt et al. | 703/20 |
| 2007/0143827 | A1* | 6/2007 | Nicodemus et al. | 726/2 |
| 2008/0172716 | A1* | 7/2008 | Talpade et al. | 726/1 |

OTHER PUBLICATIONS

OPC Foundation, "About OPC—What is OPC?", 2 pages, retrieved Feb. 21, 2008, from http://www.opcfoundation.org/default.aspx/01_about/01_whatis.asp?MID=AboutOPC.
RedSeal Systems, "Instant Visibility. Threats Averted," 4 pages, first accessed Mar. 10, 2008, from http://www.redseal.net/Product-Overview.shtml.

(Continued)

*Primary Examiner* — Christian LaForgia
*Assistant Examiner* — James Turchen
(74) *Attorney, Agent, or Firm* — Nathan O. Greene; Brinks Hofer Gilson & Lione

(57) ABSTRACT

A method for analysis of distributed device rule-sets for compliance with global policies includes enabling an administrator to specify a network topology with intercommunicating elements and parameters required to secure the intercommunication with access control elements of the network topology; establishing connections to the access controls elements to capture a snapshot configuration of device rule-sets of the access control elements; enabling the administrator to specify a set of global access constraints with reference to the access control elements; enabling the administrator to select between exhaustive analysis and statistical analysis; conducting the selected analysis to determine violations by the device rule-sets that fail to comply with the set of global access constraints, wherein statistical analysis quantitatively characterizes a level of compliance without conducting analysis of all potential network paths; and providing results of the selected analysis to the administrator through a graphical user interface (GUI) as the results are obtained.

34 Claims, 9 Drawing Sheets

OTHER PUBLICATIONS

RedSeal Systems, "Risk Management: RedSeal Security Risk Manager," Information Security Magazine, 1 page (Jun. 2007).

Skybox Security, "Automating Network Access Policy Compliance," 1 page, retrieved Feb. 21, 2008, from http://www.skyboxsecurity.com/solutions/security6.html.

Skybox Security, "Enterprise," 2 pages, retrieved Feb. 21, 2008, from http://www.skyboxsecurity.com/solutions/enterprise.html.

Skybox Security, "Skybox and Internet Security Systems Deliver First Virtual Modeling Environment for Intrusion Prevention Systems (IPS)," 2 pages, retrieved Mar. 10, 2008, from http://www.skyboxsecurity.com/news/press_releases/060725_ISS.html.

Skybox Security, "Skybox Secure," Skybox Secure Data Sheet, 4 pages (Mar. 2007).

Skybox Security, "Skybox Secure Product Line," 2 pages, retrieved Feb. 21, 2008, from http://www.skyboxsecurity.com/products/secure.html.

Skybox Security, "Skybox Security Introduces Industry's First Security Risk Management (SRM) Blueprint to Drive the Advancement of the IT SRM Market," 2 pages, retrieved Mar. 10, 2008, from http://www.skyboxsecurity.com/news/press_releases/060725_blueprint.html.

Skybox Security, "Vulnerability Assessment Tools (Scanners)," 1 page, retrieved Feb. 21, 2008, from http://www.skyboxsecurity.com/products/vulnerability.html.

Skybox Security, "What is the SRM Blueprint?" 2 pages, retrieved Feb. 21, 2008, from http://www.skyboxsecurity.com/products/blueprint.html.

* cited by examiner

ANALYSIS OF DISTRIBUTED POLICY RULE-SETS FOR COMPLIANCE WITH GLOBAL POLICY

RELATED APPLICATIONS

This application claims priority to U.S. Provisional Application 60/941,132, filed May 31, 2007, which is herein incorporated by reference.

FEDERALLY SPONSORED RESEARCH

This invention was made with Government support under Contract Number CNS-0524695 awarded by the National Science Foundation (NSF). The United States Government has certain rights in the invention.

TECHNICAL FIELD

The present disclosure relates to methods and a system for analyzing distributed policy rule-sets for compliance with global policies, and more particularly to finding the source of errors that cause noncompliance with the global policies.

BACKGROUND

Networked systems are used in a large number of settings, including several critical infrastructure systems, such as chemical plants; electric power generation; transmission and distribution; water distribution networks; waste water treatment; and enterprise networks, used in many mission-critical business settings. The emerging scenarios and the likely trends for the future of critical networked systems demand that the problem of securing these systems receive immediate attention, especially in the context of controlling access to the critical elements of the system over the communication networks. Given the mission-critical nature of a significant number of large networked information systems, it is important to ensure their protection against cyber-attacks, which, in a worst-case scenario, could result in loss of life, or in massive financial losses through loss of data, actual physical destruction, misuse, or theft.

A modern networked system includes a variety of devices and mechanisms to control access to its resources. These access control mechanisms include, but are not limited to: (1) router-based dedicated firewalls, such as the Cisco PIX series; (2) host-based firewalls, which could be based in software (such as iptables in Linux®, the inbuilt firewall in Windows XP® or Vista®, and popular products from Symantec® and McAfee® for Windows®) or hardware (such as 3Com's Embedded Firewall NICs); (3) operating-system-based mechanisms, such as discretionary access control in Linux® or Windows®, or more sophisticated mechanisms such as the mandatory access control in NSA's SELinux and similar functionality provided for Windows® by the Cisco® Security Agent; and (4) middleware-based mechanisms, such as the Java® Security Manager, that provide for specification and enforcement of fine-granularity access control policies for Java programs.

All these distributed and layered mechanisms can interact in complex ways that can lead to subtle errors and mask problems. It can be difficult to discern the global picture that emerges from the local configurations of these myriad access control elements. As a result, it is not surprising that misconfigurations of these mechanisms are a major source of security vulnerabilities. In fact, a recent study suggests that most firewalls (the most popular access control mechanism) suffer from misconfigurations. It is important for the administrators of computer networks to have ways to make sure that high-level specifications of such system access constraints are reflected in the actual configurations of the access control mechanisms spread throughout the system. Furthermore, if the implementation of policy (device configurations) is not in compliance with the specification, a diagnosis to locate the root causes of the problem would be useful.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

DETAILED DESCRIPTION

Figure 1:
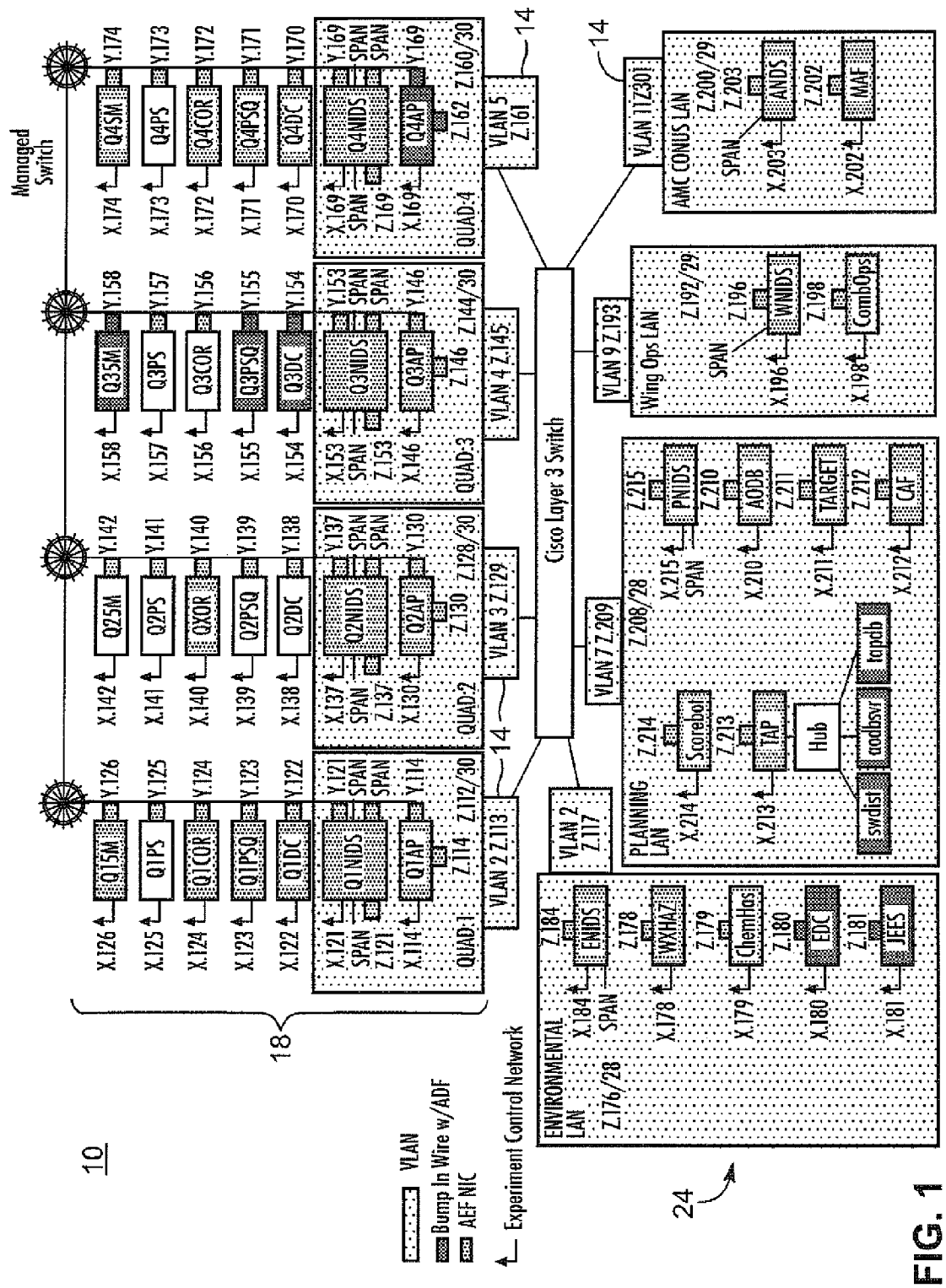
FIG. 1 is a diagram showing a representative network of the kind analyzed by the system and methods disclosed herein.

In the following description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details.

In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations. The order of the steps or actions of the methods described in connection with the disclosed embodiments may be changed as would be apparent to those skilled in the art. Thus, any order appearing in the Figures, such as in flow charts or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc., that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

This disclosure describes an Access Policy Tool (APT) (100 in FIG. 2), developed in answer to the needs described above. The APT analyzes the security policy implementation for conformance with the global security policy specification. It integrates policy rules (i.e., configuration information) from a large variety of sources typically found in a modern network and provides for a detailed offline analysis, as well as dynamic online analysis of incremental configuration changes for detection of policy implementation holes during operation. For increased usability and ease of managing information, the tool includes a graphical front-end.

Access Control in Networks

FIG. 1 is a diagram showing a representative network 10 of the kind analyzed by the system and methods disclosed herein. The network "10" will be variably referred to herein as a network system 10 to be analyzed, and is not specific only to FIG. 1, which is but an example of such a network 10. Firewalls, which may be implemented in hardware or software, are critical assets in the protection of a network. A firewall 14 or other network device is configured through its rules (collectively referred to as a rule-set), which it can use to mold and shape the traffic that crosses it. A firewall 14 or other device matches the incident network traffic against its rules, using traffic characteristics such as the source of origin, intended destination, and communication protocol, and either forbids or allows the traffic to pass through depending on the action indicated by the matching rule. Note that the servers or computers shown in FIG. 1 include a mixture of different operating systems, including SELinux, WindowsXP Professional, RedHat, Solaris 8, and Windows 2000.

As shown in FIG. 1, a typical setting usually contains a distributed firewall 14 implementation, wherein traffic may need to pass through more than one firewall to transit the network 10. In such a setting, the firewalls 14 can be used to divide the network into secure zones that limit user and application access between zones. For example, network traffic between a process control system (PCS) 18 and a business network 24 can be restricted to that which is required (including restrictions on the direction of flow). Examples of a business network 24 in FIG. 1 include environmental, planning, wing ops, or AMC CONUS local area networks (LANs).

Most companies configure firewalls to a "deny all, permit none" setting with a few exceptions. However, in reality, there are no generic rules that fit all situations, and the specific architecture of the system (e.g., the use of demilitarized zones (DMZ)) dictates how the rules should be configured for effective security at a particular site. Firewalls may further support "stateful" rules that keep track of roles in a transport control protocol/internet protocol (TCP/IP) session and only allow traffic that is consistent with the past history of the session indicated in the network packet. In addition, firewalls may provide network address translation (NAT), which creates a mapping between the IP addresses and port numbers used in the interior of the network and a (common) IP address and port number offered to the outside network.

In addition to dedicated, router-based firewalls, host-based firewalls may also exist. These are implemented in either software or hardware. Software-based firewalls, such as iptables in Linux® and several commercial ones available for Windows® of Microsoft, Redmond, Wash., are implemented in the host operating system. Hardware-based firewalls, such as 3Com's Embedded Firewall (EFW) PCI card, are implemented on the network interface card (NIC) itself, and as a result, those firewalls are tamper-resistant to cyber-attackers who might gain control of the operating system on a host.

There are published guidelines (e.g., the National Infrastructure Security Coordination Center (NISCC) guide to good practices in firewall deployment) to facilitate the development of unique rule-sets for the different firewalls at an operating site, but they are fairly generic and have to be customized by network system administrators to the specific needs of their sites.

A finer-grained access control is provided by mechanisms available on the operating system and middleware levels. They might include discretionary built-in mechanisms for managing permissions for local objects (such as files) and privileges of the processes that are present in the default installations of popular operating systems like Linux® and Windows®. In security-conscious settings, however, especially for networks managing critical infrastructure, hardened versions of the traditional operating systems have been increasingly adopted. These include SELinux (developed by the NSA), which is a secure version of the Linux® operating system. It can be configured using a large number of policy files that can be compiled into the Linux® kernel. It makes it possible to restrict the processes on a machine so that they run within domains that are isolated from each other, with explicit rules in the policy files governing transition between domains (i.e., change in privilege). It can control the ability of applications and user classes/roles to access not just file objects, but also network sockets and other applications. Policies are typically specified using type enforcement and role-based access control mechanisms. Similar functionality for Windows® operating systems can be provided through third-party software, such as the Cisco® Security Agent.

An increasing number of handheld and embedded devices that liaison with networked systems are based on, or at least support, Java®. The Java® Security Manager provides fine-grained access control similar to SELinux for the Java® Virtual Machine, and adds another avenue for access policy implementation.

The complexity of implementing an access control policy through configuration of a large number of distributed devices and the risk of conflicts among these devices has spawned a significant amount of work. However, the majority of the work focuses on internal consistency among rules of a single firewall. A conflict detection tool for distributed firewall systems has been described in E. Al-Shaer and H.

Hamed, *Discovery of Policy Anomalies in Distributed Firewalls*, In *Proceedings of the IEEE INFOCOM*, volume 4, pages 2605-2616, March 2004. But, this conflict detection tool only checks for certain kinds of syntactic errors, such as overlapping rules, and not for semantic errors with respect to a specification of the intent. Furthermore, none of the work takes into account the collective fine-grained access control provided by the network-based mechanisms (e.g., firewalls) and host-based mechanisms (e.g., SELinux policies). Also, none of the above work has been applied to and optimized for specific classes of networks.

Another vector of research effort has attempted to focus on automatic generation of consistent policy implementation (at devices) from formal description of global policy. Among the commercial solutions, Cisco® provides Cisco® Works, a suite of products that enable top-down firewall policy management. The suite includes a firewall management center to manage configurations, a secure policy manager to generate policies from higher-level specifications, and Mars, for log/audit analysis. Those solutions provide for rule-set specification and top-down management, and do not help with validation of existing implementations. They are also largely limited to firewalls, and, even there, to certain brands and models of firewalls. Furthermore, they require specification of detailed and exhaustive global security policy. For most current network system administrators, the ability to check existing configurations against policy specifications that indicate intended high-level behavior is likely of more utility.

Analysis Framework

Figure 2:
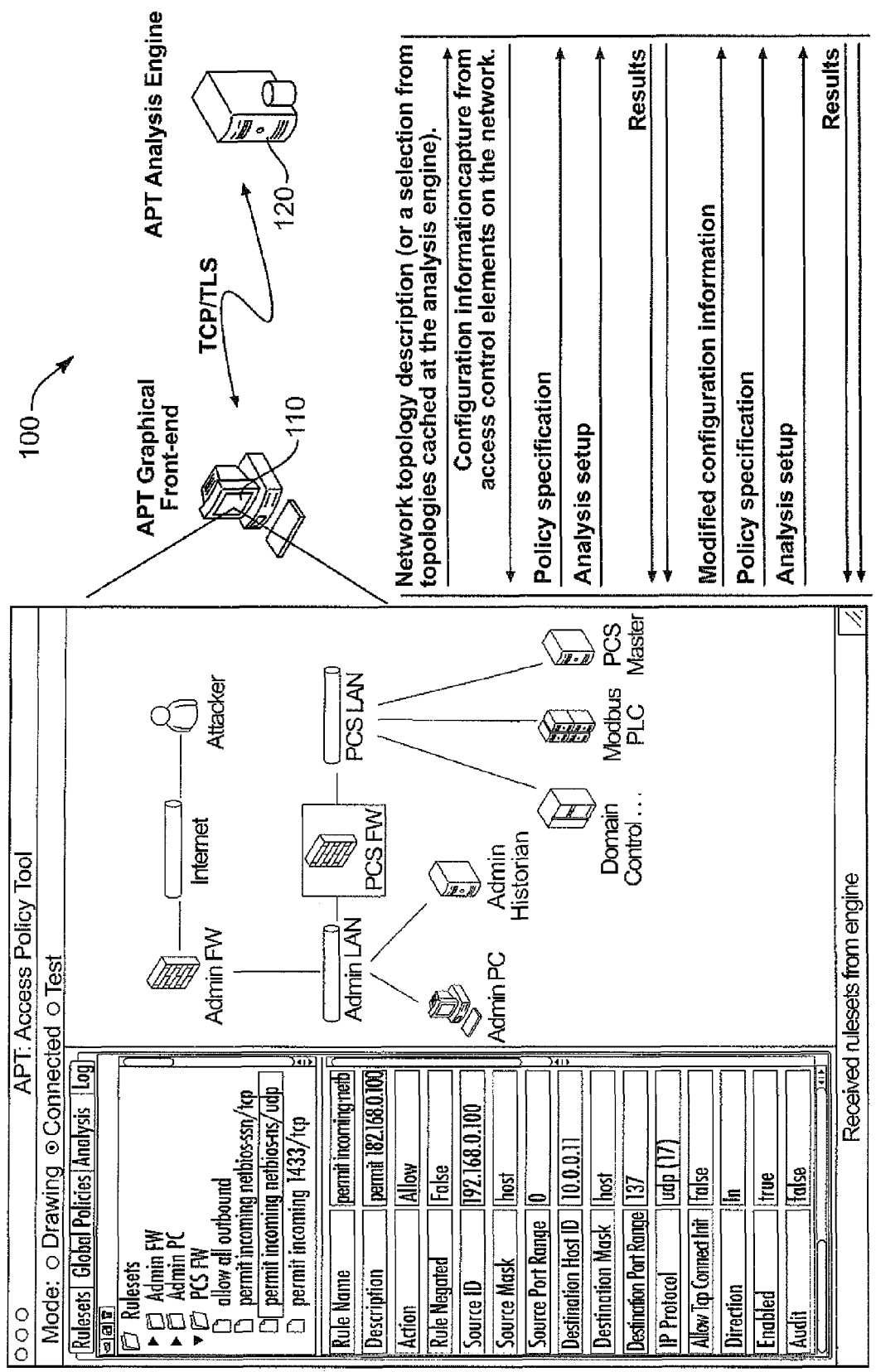
FIG. 2 is a diagram that provides an overview of the tool architecture available to an administrator accessing a graphical front-end of an Access Policy Tool (APT) system to perform comprehensive analysis of the access control policy implementation in a large networked system.

FIG. 2 is a diagram that provides an overview of an Access Policy Tool (APT) 100 architecture available to an administrator (or user) accessing a graphical front-end 110 of the APT 100 (variably referred to herein as the APT system 100) to perform comprehensive analysis of the access control policy implementation in a large networked system 10. FIG. 2 also describes the interaction between the APT graphical front-end 110 and an analysis engine 120 of the APT 100 during the analysis process. The following begins with a summary of features of the Access Policy Tool (APT) 100 followed by a description of several specific aspects in more detail in the subsequent, separately titled sections.

The graphical front-end 100 or user interface (GUI) of the APT 100, which may be written in Java® Swing, runs independent of the analysis engine 120, which may be written in C++, with the two ends communicating securely via TCP. This makes it possible to deploy the analysis engine 120 as an appliance that can be plugged into a suitable spot in the network 10, with the front-end 110 being used as a management console that users of the tool 100 (such as a system administrators) can run from their workstations. The analysis engine 120 can be configured with basic information about the topology of the network 10 on which the APT 100 is deployed and parameters for secure access to the various constituent devices. With that input, it can securely obtain a snapshot of the security configuration (e.g., rule-sets for the firewalls or policy files for SELinux installations).

The configuration information obtained may be translated into an extensible markup language (XML) (or another appropriate language) schema designed to be able to handle a variety of types of information. The configuration information, together with the topology, is used to generate a specialized data structure called a multi-layered rule graph. Each node in the rule graph represents a possible access decision in the network 10 (e.g., a rule in a Cisco® PIX firewall that incoming traffic might match), with paths representing possible sequences of access decisions. The APT system 100 can enumerate the possible attributes of the traffic and user classes that can traverse a path in the rule graph (i.e., the attributes of the traffic that can undergo the sequence of access decisions represented by the path), and those attributes can be checked against a specification of global access policy for potential violations. Various efficient data structures and algorithms are used for representation and manipulation of the traffic attribute sets. The data structures involve representing the related multi-layer rule graphs compactly, and support rapid traversal thereof as will be explained in more detail below.

The APT 100 can perform a comprehensive, exhaustive analysis, wherein the rule graph data structure is analyzed in its entirety and all possible violations of the specified access policy are enumerated and suitably highlighted in the front-end's graphical display. When the network 10 size makes an exhaustive analysis impossible, the APT 100 supports a statistical analysis to quantitatively characterize the conformance of the policy implementation to the specification of the global access policy (GAP). It does so using a set of statistical techniques known as importance sampling, backed by appropriate mathematical constructs as well as analytical (or empirical) proofs of variance reduction. As a result, a fairly accurate estimation of the security posture can be obtained with only a very limited (and hence, fast) exploration of the rule graph data structure. The APT 100 will also support dynamic online analysis of incremental changes to security configurations for detection of policy implementation holes that may be introduced during the operation of the network 10. In that mode, changes can be automatically detected by the APT 100, and fast analysis can be performed using the results from the previous comprehensive analysis and the localized nature of the new changes.

APT Architecture

Accordingly, the analysis tool 100 has two independent components: (1) the graphical front-end 110 (or the management console) that system administrators can run from their workstations and use to provide information about the basic network topology, specify specifications of the global access policy (GAP) (or subsets thereof and set up analyses; and (2) the analysis engine 120, which captures the network 10 system state and analyzes that information with respect to policy specifications.

As indicated in FIG. 2, the two components of the tool communicate securely over the network using TCP and/or transport layer security (TLS) protocols. This segregation of functionality makes it possible to use the analysis engine 120 to be used as an appliance that can be plugged into a suitable spot in the network 10 from which it can establish secure connections to the access control elements present on the network 10, and capture the relevant configuration information. The actual interface between the tool 100 and the user front-end 110 can then be freely placed where it is convenient for the administrator.

As shown in FIG. 2, the administrator first provides a description of the network topology using the graphical front-end 110. That can be done using the easy-to-use drawing tools included with the front-end 110. The information to provide includes all the relevant access control elements (firewalls, proxy servers, wireless access points such as displayed in FIG. 1); details for each element, such as its IP addressees) and parameters that the analysis engine 120 can use to establish secure connections to the element to capture its configuration; and all the network interactions between the listed elements. Entities can be grouped together to indicate sub-networks and LANs, and properties can be specified for such groupings.

XML may be used as the underlying language for internal representation for most of the information in the tool, which provides the added benefit of being able to interface with third-party tools and applications simply by providing wrappers that output the XML conforming to schemas of the APT 100. The front-end 110 converts the visual topology representation provided by the administrator to an internal XML representation. It is also possible to browse and select from the list of topology descriptions previously cached topologies remotely at the analysis engine 120. In either case, once the topology is decided, the information is sent over the network 10 to the analysis engine 120.

The analysis engine 120 uses the received information to securely obtain the snapshot of the access control policy implementation, in the form of configuration files from the various devices indicated in the topology description (described in more detail below with reference to "Analysis Engine Intervals"). The analysis engine 120 also indexes and caches the topology description and captured configuration information. The captured information from all the different sources may then converted to a unified XML schema, and the resultant XML is sent back to the front-end, where the administrator can now highlight various elements in the topology diagram and look at their current configurations (e.g., rule-sets for a firewall). Note that the unified schema functions for firewall devices, but not for some host-based policies such as those found in SELinux. These host-based policies and rules may be expressed in XML and sent to the engine 120 separately and in a different format from the unified rules.

The administrator then specifies the global access constraints, which are a subset of the possible comprehensive security policy. Global access constraints indicate some intended behavior against which the administrator wishes to check the policy implementation for compliance. The administrator uses the graphical front-end 110 to specify constraints for the various elements or groupings of elements, and the APT 100 considers their conjunction, applying conflict resolution rules in the event that two constraints yield conflicting access decisions. The individual constraints can express positive as well as negative assertions about the nature of traffic, roles, user-classes, or applications that can access a particular grouping of resources (hosts, specific files or applications, and so forth). In other words, events and/or errors that should never happen, as well as things that must be allowed, may be expressed by the APT 100.

For example, in a process control system (PCS) where the tightly controlled isolation of the process control network (PCN) is a key to security, using the APT's graphical front-end 110, the APT 100 can specify global access constraints indicating that the hosts in the PCN should be accessible from each other. But, the APT 100 also specifies that only specially designated hosts (historians) should be accessible from outside the PCN, and that even they should be accessible only on very specific protocol ports and only by certain classes of users (say, managers and system administrators) accessing from a particular sub-network. Once the constraints are specified, they are converted into an internal XML representation. This further gives the administrator the freedom to use third-party technologies, such as a variety of modal logics, to specify the global access constraints.

The next step for the administrator is to set up the analysis. The administrator can select either an exhaustive analysis or a statistical analysis, each of which has certain configuration parameters that need to be provided. Once that is done, the front-end sends the policy specification and setup information for the analysis to the analysis engine 120. The analysis engine 120 sends back the results as it obtains them, giving the administrator the option to abort the analysis at any stage and do post-analysis on the partial results. The administrator can manipulate, filter, and/or navigate through the results, and if any violations are found, can visualize the problem and diagnose the key misconfigurations behind the violations.

A variety of post-analysis techniques are available in the front-end 110 to help the administrator identify the root causes of the violations. Once the administrator has some possibilities in mind, hypothetical changes can be analyzed using the front-end: the administrator can make proposed changes to the configuration of various elements (e.g., modify, delete, or reorder certain rules), and the new information will be sent to the analysis engine 120, which then performs a quick re-analysis to see if the hypothetically modified configuration information now conforms to the specification of the access policy. This feature can also be used to check planned changes in configuration for compliance quickly before they are actually rolled out.

Analysis Engine Internals

Figure 3:
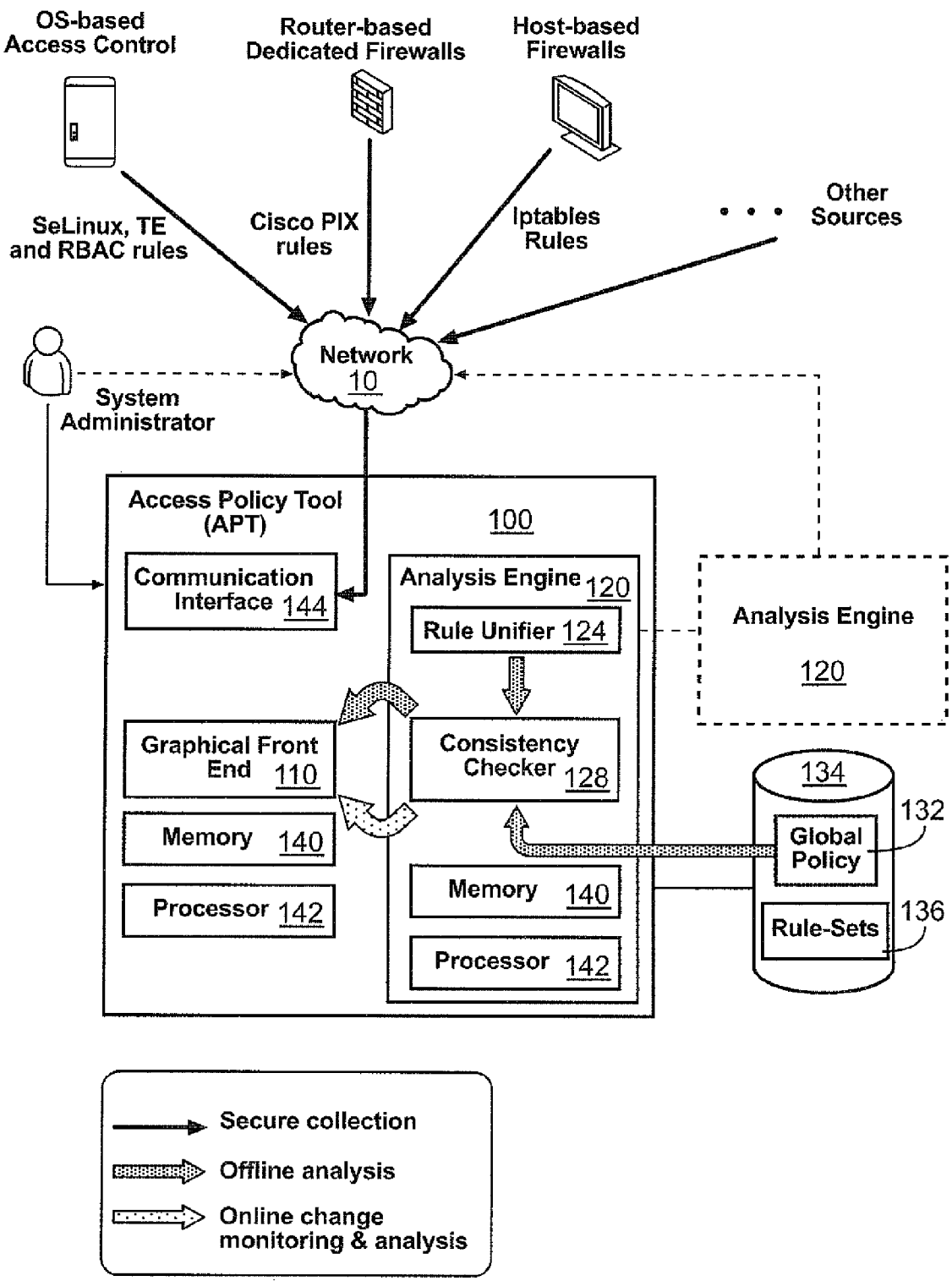
FIG. 3 is a system diagram that gives an operational overview of the APT system, which includes the graphical front-end and an analysis engine.

FIG. 3 is a system diagram that gives an operational overview of the APT system 100, which includes the graphical front-end 110 and the analysis engine 120. The analysis engine 120 may further include a rule unifier 124 and a consistency checker 128. A global policy 132, including access control constraints, may be stored in a database 134 or other memory storage. The database 134 may also store a plurality of rule-sets 134 that are obtained from secured devices located within an administrator-specified network topology. The global policy 132 may be made available in XML to the consistency checker 128 of the APT 100 so that it may be analyzed with reference to the access policy implementation of the network 10 devices, which is provided by the rule unifier 124. As discussed previously, the analysis engine 120 may be designed as a portable appliance that may be located at any location (shown in dashed lines) throughout the network 10. Accordingly, the analysis engine 120 may include its own processing power and storage capabilities.

The APT 100 may be implemented as a computer, server, mobile device, or one or more computing devices. Accordingly, the APT 100 may also include a memory 140, a processor 142, and a communication interface 144 that are coupled to each other and that electrically communicate with the front-end 110, the analysis engine 120, and the database 134, e.g., through a system bus (not shown). The communication interface 144 communicates with the network 10 to send and receive data communication from access control elements thereon.

The graphical front-end 110 supplies the analysis engine 120 with information about the network topology and the parameters for establishing secure network connections with the access control elements of the topology. Examples of such parameters include keys for establishing VPN connections to Cisco® PIX firewalls and a guest username/password for establishing secure shell (SSH) connections to Linux®/SELinux hosts. Using the supplied information, the analysis engine 120 can establish connections and obtain the relevant configuration information, hence capturing a snapshot of the access policy implementation, e.g., with the network-wide compilation of device rule-sets. The configuration information can take many forms depending on the mechanisms and devices being used to enforce access control. The configuration information may consist of custom rule descriptions for different kinds of firewalls, SELinux type and role transition policies, and/or Java® Security Manager policies, and/or other host-based access control policies.

The APT 100 integrates (or combines) policy rules from a large variety of such sources. A unified XML schema has been developed that captures the essence of the union of all the classes of access control mechanisms that one is likely to encounter in a modern information technology (IT) network 10. The analysis engine 120 includes modules that convert the policy rules (configuration information) from the different sources (with the exception of host-based policies such as SELinux discussed above), with the rules from each source in their own custom language, into XML (or other common language) conforming to the unified schema. That allows for easy extensibility as support for new access control mechanisms and devices can be added by simply writing the translation modules for those devices. The host-based policies and rules (such as SELinux) may be expressed in XML and sent to the engine 120 separately and in a different format from the unified rules.

In the APT's offline analysis mode, it is not necessary to tightly integrate the analysis engine 120 with the system being analyzed, and if needed, the analysis engine 120 can be directed to read in the configuration snapshot that has been collected offline a priori and placed locally on the file system. In the online analysis mode, the analysis engine 120 either periodically checks with access control devices for any changes in configuration, or is specifically directed towards those changes by the administrator via the front-end 110.

Figure 4:
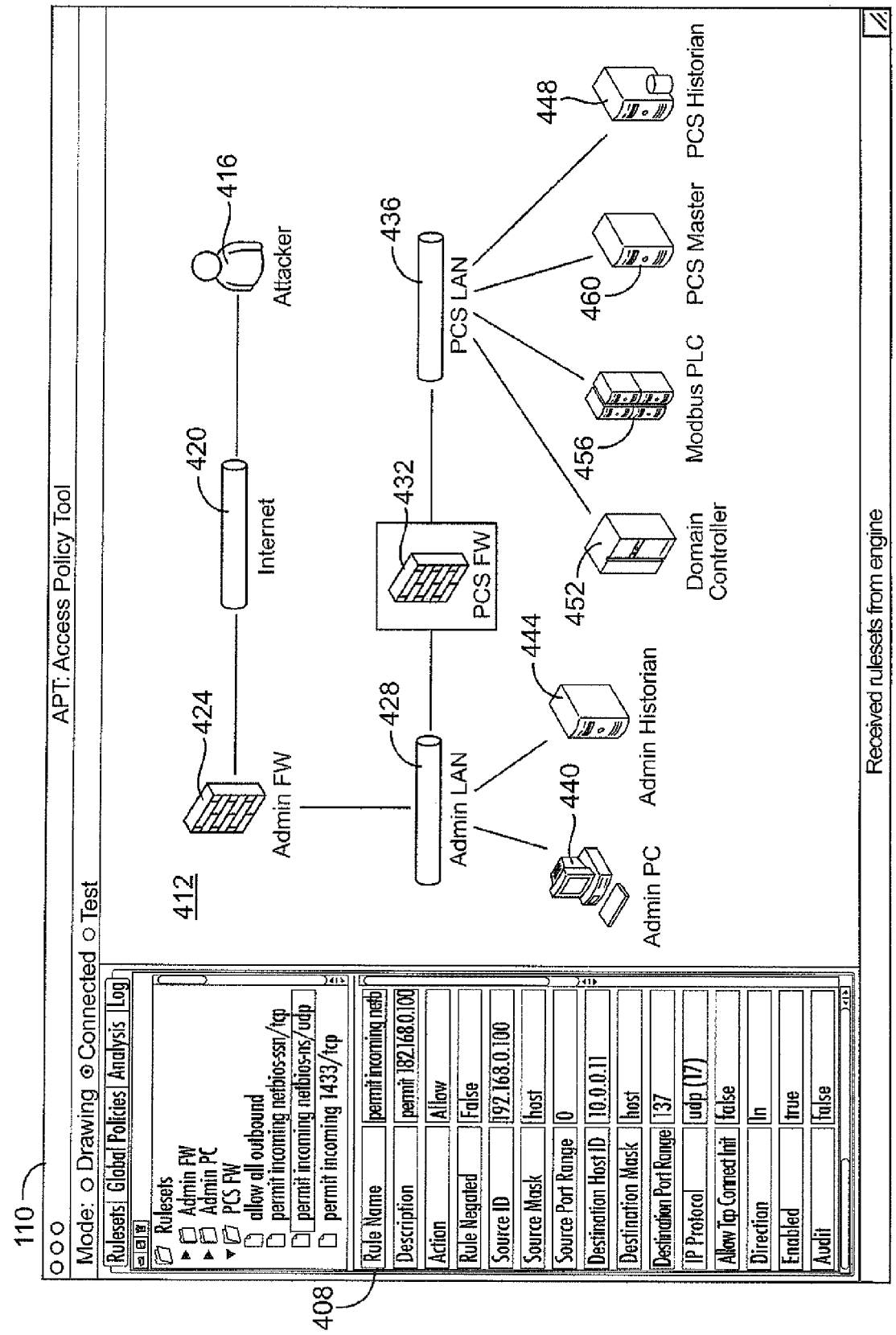
FIG. 4 is an example portion of a user graphical front-end for accessing rule-sets in the APT system.

FIG. 4 is an example portion of a user graphical front-end 110 for accessing rule-sets 136 in the APT system 100. The various rule-sets 136 may be browsed through for review, and updated, if need be, manually. Note that the administrator may click on a specific rule that is tied to one of the network devices (or access control elements), after which the detailed information for that rule is displayed for viewing or alteration in the below left window 408. The topology being analyzed is shown a right window 412 of the front-end 110; the network devices of the topology correspond to the rule-sets 136.

The below left window 408 includes detailed information that may be changed or updated through the user front-end 110. From the top to the bottom, the below left window 408 may include, but is not limited to: (1) a rule name, preferably something helpful for tracking; (2) a description, which adds detail to what the rule does, for instance, permit 192.168.0.100; (3) an action, which can be to allow or deny, for instance; (4) a field to indicate whether or not the rule is negated, for instance by operation of another rule through the same network 10; (4) a source ID address, which is an internet protocol (IP) address from which traffic is allowed, and may include a range of IP addresses (FIG. 7) to create a bit pattern of IP addresses affected by the global access policy; (5) a source mask, here "host," or an indication of the network mask to use with the source ID address; (6) a source port range, which may include more than one port; (7) a destination host ID address or range of IP addresses to which traffic is allowed to be sent; (8) a destination mask; (9) a destination port range, which may include more than one port; (10) IP protocol or protocols that are supported; (11) a field that indicates whether or not to allow a TCP connection to be initialized; (12) a direction of the traffic (in or out); (13) a field that allows an administrator to enable/disable the rule; and (14) an audit field to enable auditing of rule changes.

In the right window 412 is the topology of the network 10 being analyzed, and the one displayed is only exemplary. The topology indicates the position of an attacker 416 through an internet 420. The attacker 416 has to get through an administrative firewall (FW) 424, through an admin LAN 428, and then through a PCS 432 to gain access to a PCS LAN 436. An administrative PC 440 and an administrative historian 444 are located on the administrative LAN 428 side of the firewalls (424, 432). The administrative historian 444 is configured so that it can read through the PCS FW 432 to read a PCS Historian 448 off the PCS LAN 436. Network devices that also communicate through the PCS LAN 436 include a domain controller 452, a Modbus programmable logic controller (PLC) 456, and a PCS master server 460. Similar network devices and topologies are further exemplified through this disclosure, but description thereof will not be repeated as the APT system 100 is designed to analyze any topologic network 10.

Consistency Checker

With further reference to FIG. 3, the consistency checker 128 forms the core of the analysis engine 120. It takes as input the XML representations of the collective configuration information from the various devices and of the formal specification of the access constraints provided by the front-end 110, and sets up an analysis based on the parameters supplied by the administrator (using the front-end 110). As described with reference to the "APT Architecture," the output, in the form of the list of violations, is sent back to the front-end 110. In the online mode, if an intrusion detection and alert correlation system has been deployed on the network 10, the results may also be forwarded to that system in the form of an alert.

Figure 5:
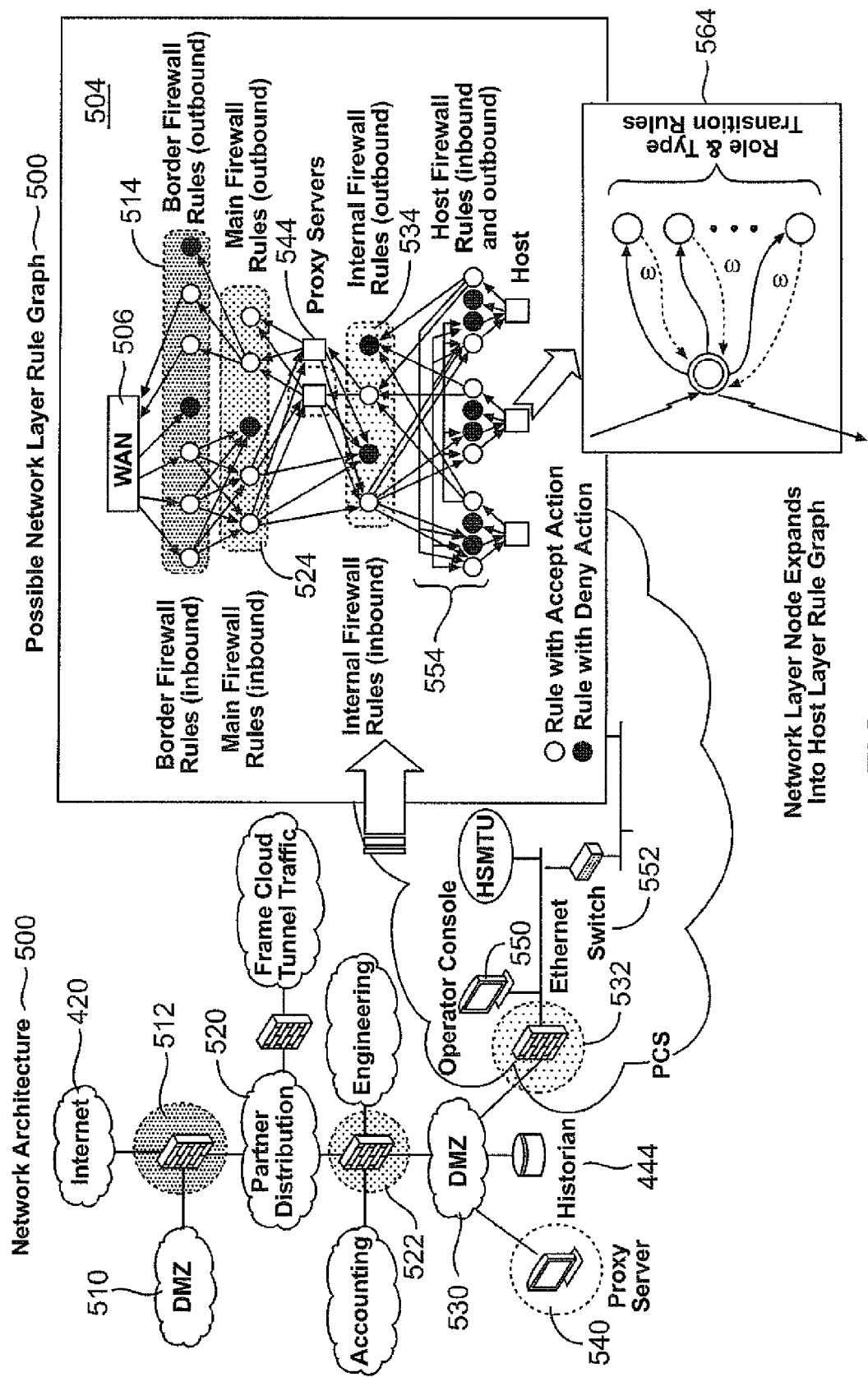
FIG. 5 shows an example network topology on the left and a corresponding possible multi-layered rule graph on the right as represented by a consistency checker of the APT system.

FIG. 5 shows an example network topology 500 on the left and a corresponding possible multi-layered rule graph 504 on the right as represented by a consistency checker 128 of the APT system. The network topology 500 and the configuration information (policy rules) from the access control devices (or network layer nodes) are internally represented by the consistency checker 128 using a specially constructed data structure called a multi-layered rule graph 504. FIG. 5 shows a simplified representation of a possible two-layered rule graph for the network shown on the left. The "multi-layer" designation is due to the fact that the analysis of the network topology 500 is spread through at least two hierarchal levels of traffic flow, e.g., operating systems of network devices, firewalls at the network level, and perhaps up to Java virtual machine (VM) level, for example. Additional layers may also be introduced as sub-networks of the network topology 500 in which the sub-network is treated as a single layer for the purpose of one or more rule-sets.

For instance, in the network topology 500 of FIG. 5, the internet 420 is represented by the WAN layer 506 of the network layer rule graph 504 at right. A demilitarized zone (DMZ) 510 is created between firewalls 512, which may be represented by the border firewall rules layer 514 at right. The DMZ 510 is boxed in by firewalls 512 except for a cut-outs or proxies through which traffic is specifically allowed. A partner distribution 520 of network devices represents those network devices that the APT system 100 can analyze through permissive accessibility to the same. Additional firewalls 522 may be located throughout various locations of the network topology 500 and together may be represented by the main firewall rules layer 524 at right. These firewalls 522 may further secure traffic from various sub-networks such as displayed: accounting, engineering, or frame cloud tunnel traffic that is configured to send traffic specific to particular applications.

Furthermore, another DMZ 530 may be positioned just before the locations of host servers or devices, and which communicates with an internal firewall 532. The internal firewall 532 may be represented by the internal firewall rules layer 534 at right. Any proxy server 540 or historian 444 may be represented by the proxy servers layer 544 at right. The operator console 550 and the switch 552 may include host firewalls of software and/or hardware and may be represented by the host firewall rules layer 554 at right, in the multi-layer rule graph 504.

The rules in the multi-layer rule graph 504 are represented by circles (or network nodes) that either have an accept action or a deny action. If a network data packet has characteristics that match a source destination according to a first rule, then an accept action (or deny action), whichever applies, is executed to either pass the packet on through the network 500 or to deny further movement. If the rule is inapplicable to the data packet characteristics, then a second rule is checked, which can be located in another network layer, and so forth through all the rules such that the data packet is appropriately acted upon. If no rules apply to the data packet, the default action is usually to deny the data packet further passage through the network 500. A bottom right inset 564 depicts how a network layer node expands into a host layer rule graph, and reference thereto will be made below.

Figure 6A:
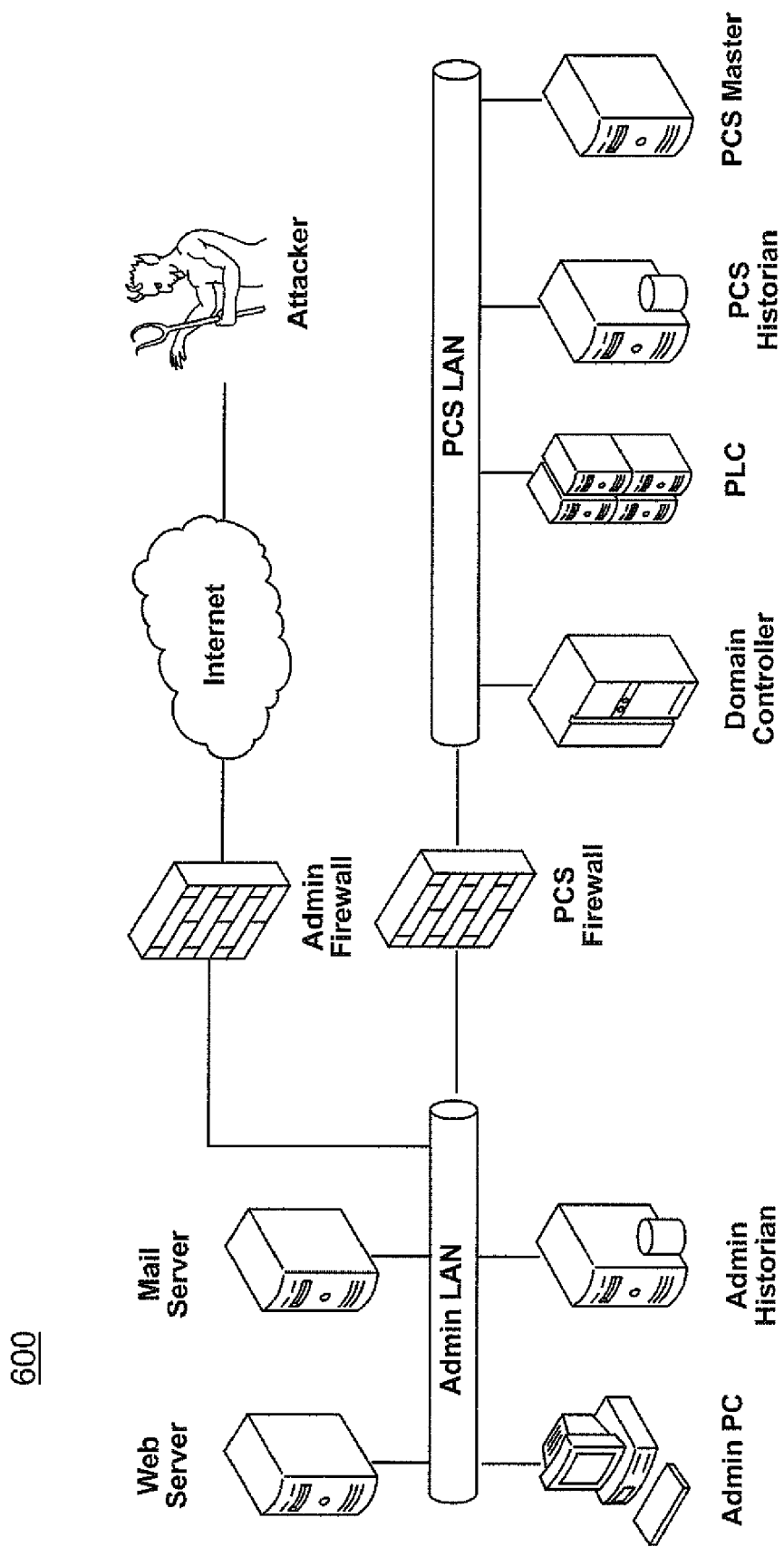
FIGS. 6A and 6B are, respectively, another example network topology diagram and a corresponding multi-layered rule graph as represented by the consistency checker of the APT system.
Figure 6B:
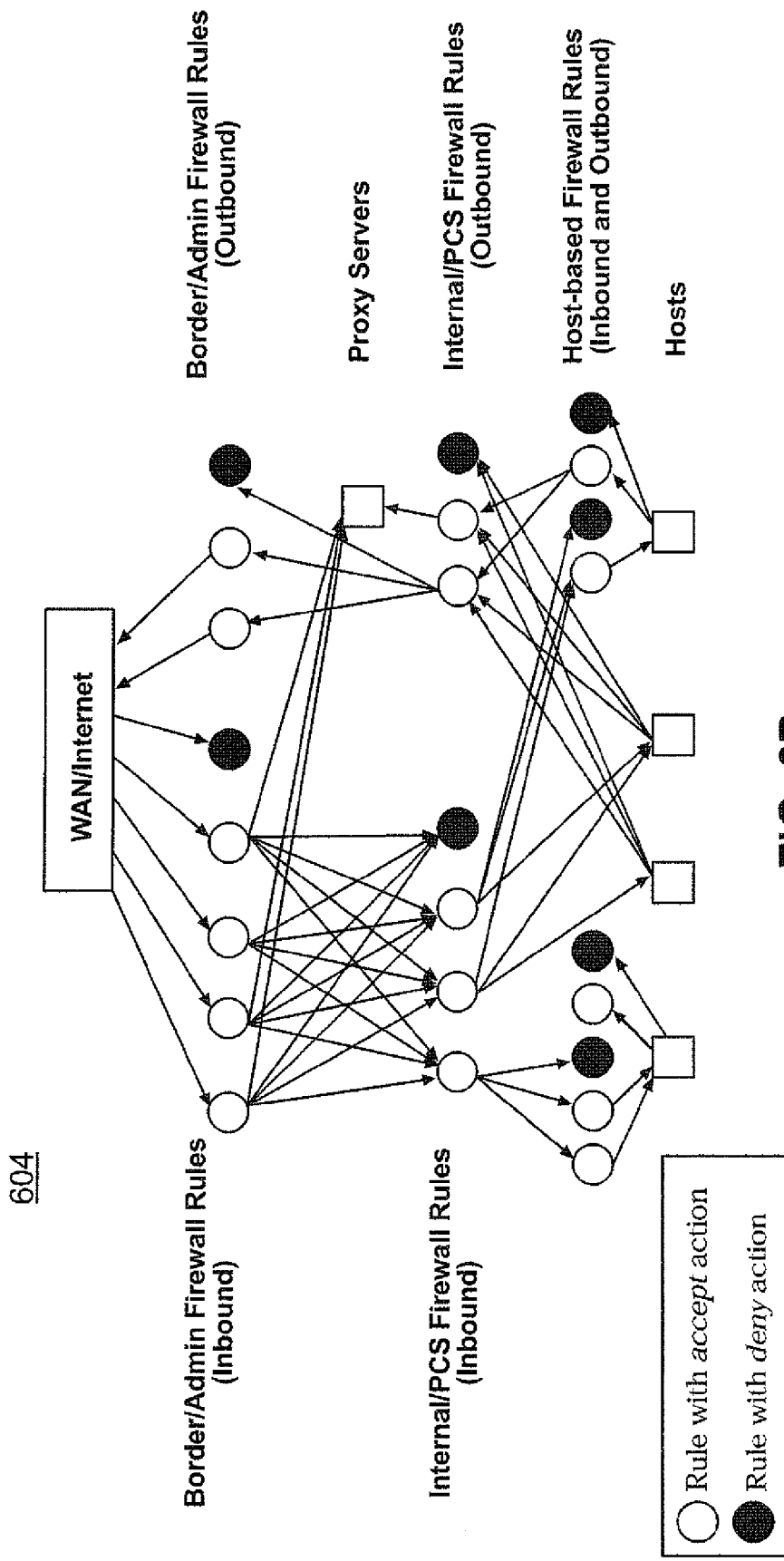

FIGS. 6A and 6B are, respectively, another example network topology diagram 600 and a corresponding multi-layered rule graph 604 as represented by the consistency checker 128 of the APT system 100.

The rule graph (FIGS. 5 and 6B) captures the network interconnectivity and data flow among the policy enforcement rules. In the top-level, or the network-layer, rule graph, there are nodes that correspond to devices that accept traffic and other nodes that correspond to rules in devices through which traffic passes. A firewall (dedicated or host-based) is represented by as many nodes as it has rules, with both inbound and outbound rules being presented, and a host (terminal or proxy) is represented by just one node. For instance, a node representing rule $r_j$ in firewall $F_m$ directs an arc to a node representing rule $r_j$ in firewall $F_n$ if the action (access control decision) associated with the rule $r_j$ is to accept, and a network packet that is thus accepted can be received (in accordance with the network topology) by firewall $F_n$. A node representing a proxy host (that allows for traffic to pass through it) has both incident and outgoing arcs.

Nodes representing hosts may further expand into a lower-level rule graph 564. FIG. 5, bottom right, shows a potential host-layer rule graph 564 (modeled as a directed graph with labeled edges) representing the SELinux policy rules for one of the hosts in the network-layer rule graph. The arcs in this rule graph change the security contexts and/or the permissions of various objects present on the host. Paths through this rule graph represent ways by which processes in the operating system can copy data through different contexts, and be made available to different readers. These paths show how a data object can be received from the network, pass through different processes and contexts, and then be retransmitted into the network, using (potentially) different owners, different permissions, and different network ports.

The overall strategy used by the consistency checker 128 is to analyze paths from traffic sources to terminal nodes in the rule graph. A terminal node may be a rule associated with a "deny" action, a destination, or an exit from the system. A path describes a possible sequence of access policy decisions applied to all traffic that traverses the corresponding devices in the network. The analysis approach is built around the observation that knowing which rules in the system make decisions about a piece of traffic tells us something about the attributes of that piece of traffic A network packet arriving from the Internet may in principle carry any source address, any destination address, and any protocol. If the packet is accepted by a particular rule in the border firewall, then it is inferred that its attributes do not satisfy the preconditions of the earlier rules in the firewall's rule-set, but do satisfy the preconditions of the rule that it matched. Every time a rule recognizes traffic, it refines the attributes of the traffic to reflect the constraining influence of the rules against which the traffic was tested at the firewall. Given a path in the rule graph, the consistency checker 128 can compute successive refinements of the attribute set of traffic, user classes and object permissions that can possibly traverse that path. At each stage along a path, the current attribute set is matched against the formal specification of the access constraints to confirm whether it is in violation.

Figure 7:
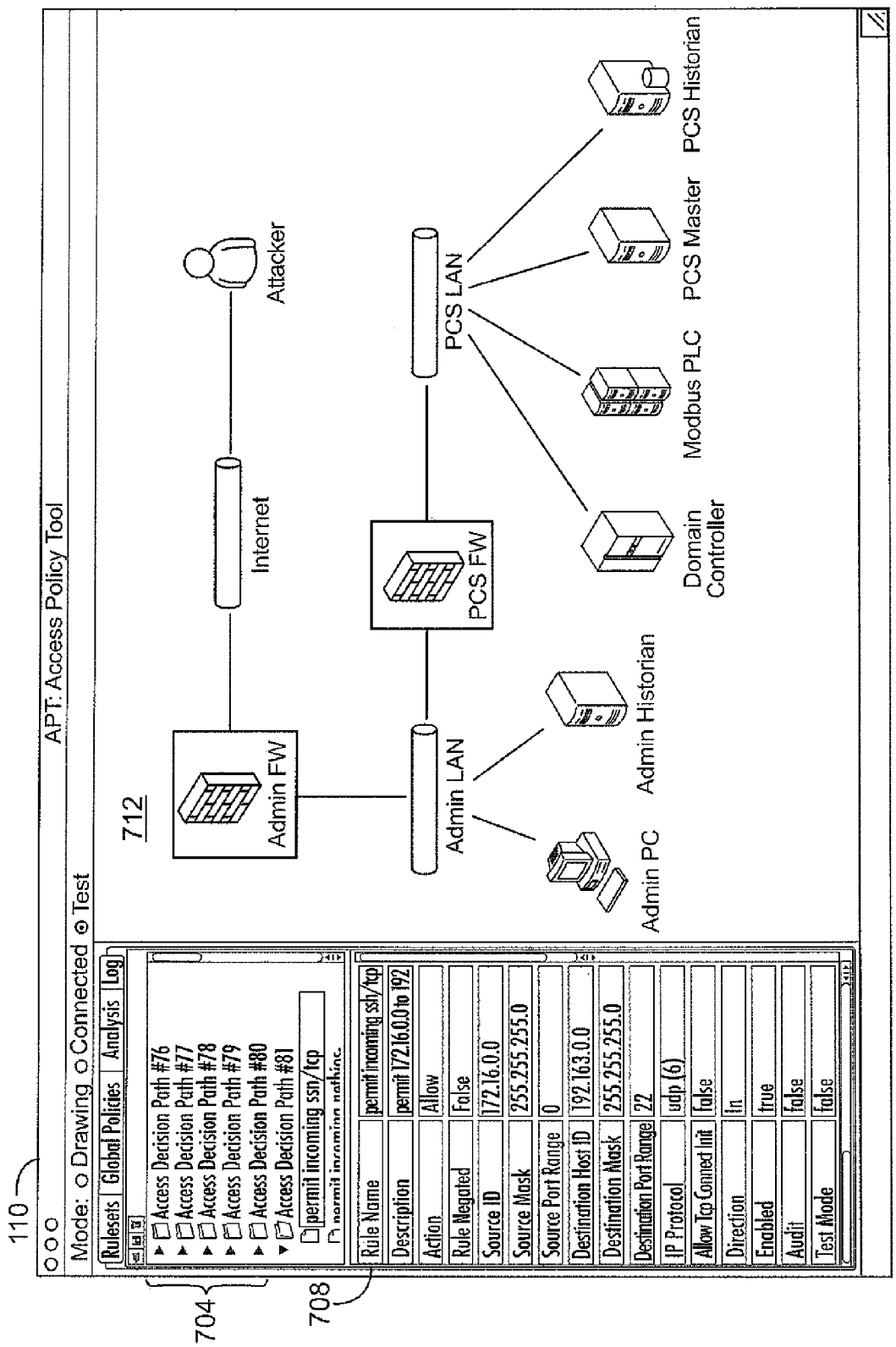
FIG. 7 is an example portion of a user graphical front-end for accessing rule graph analysis as performed by the APT system.

FIG. 7 is an example portion of a user graphical front-end 110 for accessing rule graph analysis as performed by the APT system 100. Note that access decision paths 704 are listed as are those paths that violate at least one rule-set. In the "Likely Root Causes" option, details of the likely reasons for path violation are listed. As in FIG. 4, details of a selected path (and associated rule) are listed in a below left window 708. When a path 704 is selected, if it is in violation of a global access policy, the details displayed in window 708 indicate the node where the error is being caused, the rule being violated, and other relevant tracking information. Additionally, the network topology that is under analysis is shown in the right part 712 of the window of the user front-end 110.

Exhaustive Analysis

In the exhaustive analysis mode, the consistency checker 128 analyzes the multi-layered rule graph 504, 604 for the system in its entirety, considering each piece of configuration information collected and all potential paths therethrough. It then produces a complete list of sequences of access decisions (e.g., firewall rules or SELinux transition rules) that can result in traffic that violates one or more of the global access constraints. The analysis can be directed to use a specific starting point as the initial source of the traffic (e.g., a particular host, a wide area network (WAN), or the Internet); if a starting point is not specified, all the hosts in the topology are considered starting points in turn.

The data structures for rule graphs and traffic attribute sets, and the algorithms to manipulate them, contribute to successful analysis performance. A number of optimizations are used for analysis speed-up. They include the use of multidimensional interval trees for representing the network traffic component of the attribute sets and custom set data structures for efficient representation of the discrete component of the attribute sets (e.g., security contexts or object permissions). Also used is the intelligent caching of results of analyses of sub-paths to minimize repeated computations.

Whether the analysis is performed online or offline, the APT 100 may enable an administrator to choose between exhaustive or statistical analysis based on the administrator's desired level of analysis and in light of the complexity or extensiveness of the network 10, and thus of the multilayered rule graph 504, 604. The APT 100 may also automatically determine the likely resources required for an exhaustive analysis, and make a recommendation on behalf of the administrator to use statistical analysis in lieu of exhaustive analysis where the latter is seen as the default choice. The APT 100 may also make a choice on behalf of the administrator to conduct a statistical analysis where the time required to conduct an exhaustive analysis would be unacceptably too much time, e.g., beyond a threshold level such as 24 hours or the like. As will be discussed, statistical analysis can be much quicker and may provide acceptable results in terms of finding violations of the GAP.

Statistical Analysis

When the networked system 10 (considered together with the relevant components of the IT network) being analyzed is large and deep, the sheer combinatorics of the possible interactions among the access control devices and mechanisms may render a comprehensive exhaustive analysis computationally impossible. The underlying rule graph 504, 604 would simply contain too many paths to allow an exhaustive exploration, especially when the actual paths of interest (i.e., the violations) form a very small subset of the set of all possible paths through the rule graph 504, 604. This is also especially the case where the APT 100 is capable of providing such defense in depth, or in other words, capable of providing access control analysis and violation detection through the many depth layers of the network 10.

To handle this challenge, the APT 100 incorporates an advanced statistical analysis mode. The statistical analysis produces a sample, and likely incomplete, set of policy violations, and a quantitative estimate of the remainder. The latter may take the form of estimates of the total number of violations, the average number of rules (or other access decisions) in a violation, or the probability that there are no violations given that none were discovered after the analysis was performed for a specified amount of time.

The APT tool 100 obtains statistically valid estimates of such quantitative measures without actually exploring the entire rule graph 504,604. It does so through repeated and random exploration of an extended version of the rule graph 504, 604 to sample a few paths, using mathematically formulated heuristics to guide the choice at each step of the exploration towards the likely sources of policy violation. The desired set of metrics is calculated for each sampled path; importance sampling is employed to remove the bias introduced by the guidance heuristic and obtain unbiased estimators of the metrics. As the analysis continues, the administrator can watch the progress of the analysis, including the convergence of the chosen set of metrics using the graphical front-end 110. The process can be continued until a user-specified relative error bound is reached or a user-specified fraction of the rule graph 504, 604 has been explored. The administrator can also abort the analysis at any time.

The concept of importance sampling can be illustrated by a simple example. Let X be a random variable with probability density function p. Consider estimating the probability, $\gamma$, that X is in some subset A of R. The probability $\gamma$ can be expressed in terms of an indicator random variable $1_{\{X \in A\}}$, whose behavior depends on X's behavior. If one samples from X's distribution and observe x, then the indicator's value is 1 when for x∈A and is zero otherwise. Hence, the probability of X being in A can be expressed as $\gamma = E_p \lfloor 1_{\{X \in A\}} \rfloor$, where the subscript p denotes the dependence of the expectation on X's distribution. The naive approach for estimating $\gamma$ by simulation would be to generate N samples, $X_1, X_2, \ldots, X_N$, using the density p, and then use $$\hat{\gamma}N = \frac{1}{N}\sum_{i=1}^{N} 1_{\{X_i \in A\}}$$

as an unbiased estimator of $\gamma(E_p[\gamma N]=\gamma)$. The width of the confidence interval around $\hat{\gamma}_N$ will be proportional to the standard deviation $\sqrt{\gamma(1-\gamma)/N}$. For the estimate to be meaningful, the magnitude of $\hat{\gamma}_N$ needs to be significantly larger than the window of uncertainty around it, i.e., the ratio of sampling standard deviation to a mean needs to be small. If A corresponds to a rare event, i.e., $\gamma$ is very small, the relative error of the estimate, defined as the standard deviation of the estimate divided by its mean, $RE_N$, is approximately $1/\sqrt{\gamma N}$. It is unbounded as $\gamma \to 0$. In order to minimize relative error, the sample size (N) must be large, and the probability $\gamma$ should also be large. Another view is that for a given $\gamma$ and target relative error, one must increase N to achieve that relative error.

Importance Sampling

Importance sampling is a way of achieving small relative error using significantly smaller N than this standard approach calls for. Defined is another probability density function p'(x), with p'(x)>0 for all x∈A such that p(x)>0. Then, $\gamma = E_{p'} \lfloor 1_{\{X \in A\}} L_{p'}(X) \rfloor$, where $L_{p'}$ is the likelihood ratio, i.e., $L_{p'}(x)=p(x)/p'(x)$, and the subscript in the expectation denotes sampling using density p'. The term p' is used to generate N samples, $X_1, X_2, \ldots, X_N$, and $$\hat{\gamma}N = \frac{1}{N}\sum_{i=1}^{N} 1_{\{X_i \in A\}} L_{p'}(X_i)$$

is an unbiased estimator of $\gamma$. Thus, it is possible to estimate $\gamma$ by simulating use of a different probability density and then unbiasing the output by multiplying it by the likelihood ratio. The sampling with a different density is usually referred to as a "change of measure" and p' is called the "importance sampling density." It can be shown that to reduce the variance of the estimator $\hat{\gamma}_N$, one may make the likelihood ratio p(x)/p'(x) small on the set A. Since p is a given, this means that one should choose a p' such that p'(x) is large on A, i.e., the change of measure makes A likely to occur. Another factor in the choice of the appropriate change of measure, especially with regard to the feasibility of simulation using the new estimator, is the cost of generating the samples.

Note that the above discussion on importance sampling also applies easily to the construction of metric estimators. If W(x) is a metric whose value depends on x∈A, one can estimate $\alpha = E_p \lfloor W(X) 1_{\{X \in A\}} \rfloor$ using exactly the same technique.

The importance sampling approach to metric estimation for use in the APT 100 has been formalized to follow model-based penetration testing. The mathematical formalism is largely identical; however, as is always the case with importance sampling, the heuristics for change of measure are different as they must exploit domain knowledge.

Now briefly described is one approach. It must be understood that all randomness in this formulation comes from the randomness of sampling, not from the system itself. If a path through a rule graph is chosen randomly, that can say something about the probability of the traffic description at the end of the path having certain properties or metrics, but the probability is with respect to the randomness used in choosing the path. The path chosen is like the random variable X in the example above, and the statement that the path has some property (such as reflecting deviation from global policy) is like an indicator $I_{\{X in A\}}$. Probability measure p reflects the random selection of rules that define the path.

Given a partial path already sampled, the action of randomly sampling to find the next rule is a matter of identifying all rules that might next legitimately be applied (i.e., in devices reachable from the output traffic of the last rule applied) and choosing from among these. Of course, not all rules in the reachable devices will apply, so some computation is done to identify legitimate extensions. With an importance sampling approach, a probability distribution is selected that biases the sampling towards rules that may lead us along paths that contribute most heavily to whatever measure is being estimated. Rules likely involved in conflicts, or nearer to the resources specified in the global policy, are excellent candidates for biasing when the measure has higher value on problem paths.

The formulation for estimating the total number of paths through the rule graph 504, 604 that satisfy some property of interest (e.g., deviation from global policy) is now described. Traversing a path in the rule graph is traversing a state space, where states are either firewall rules $<r_i^n>$ (which notation states that rule $r_i$ on firewall $F_n$ matches the traffic attributed presented to $F_n$, and would be the rule chosen if a packet from that attribute space were chosen), or (for a multi-layer node) a host action that supports the transfer of data from one context to another, or from one user to another. In both cases arcs indicate movement of data across a network or within the policy space of a host system. Let S denote the (finite) set of all states in the model. Let $S_0$ denote the set of initial states, i.e., the set of legal states in which the currently matching rule is in the rule-set of the first firewall in the path of a traffic source.

The term "sample sequence" is used to denote any infinite sequence $\{s_i, i>0\}$, where each $s_i \in S$. There is no supposition of any kind of structure other than each element of the sequence is drawn from S. The term "valid prefixes" is used to describe legitimate complete paths in the rule graph, starting in $S_0$ and terminating in a final security decision (e.g., firewall denies, or a host accepts). "Legitimate" here means that there exists a packet with attributes such that the firewall rules force it to traverse that path.

Suppose one is interested in valid prefixes that satisfy some property (e.g., they end in the violation of the global policy). V is defined to be the set of all valid prefixes with this property, and members of V are referred to as "interesting prefixes." Let a sample space, $\Omega$, be the set of all sample sequences. A probability measure P on $\Omega$ is defined such that all sample sequences are equally likely. Now, each state in S can be assigned a digit in the number system with base $|S|$ as a unique identifier. A random variable X on $\Omega$ is defined that maps a sample sequence to a real number $(0.d_1 d_2 d_3 \ldots)_{|S|}$, where $d_i$ is the identifier of the $i^{th}$ state in the path. Hence, X provides a one-to-one correspondence between $\Omega$ and $[0,1]$. Therefore, P, X is uniformly distributed over $[0,1]$, and has a probability density function $p(x)=1$ if $x \in [0,1]$ and 0 otherwise. Henceforth, the subscript $|S|$ is dropped and all real numbers are in base $|S|$.

The set of all sample sequences with the interesting prefix $(0.d_1 d_2 \ldots d_l)$ form a closed interval of length $|S|^{-l}$ starting at $(0.d_1 d_2 \ldots d_l)$. Given an interesting prefix $v$, this interval is denoted by $1_v$ and its length by $l_v$. Notice that if $v$, $w \in V$, then $I_v \cap I_w = \emptyset$. It can be seen that $A = \cup_{v \in V} I_v$ forms a finite union of disjoint intervals. Hence, the total probability of A is the sum of probability masses associated with the constituent intervals, each of which is simply the length of the interval since $p(x)=1$ on $[0,1]$. Due to the sheer size of $\Omega$, this total probability would be very small and membership in V would be a rare event under P.

The objective of this formulation is the construction of an unbiased estimator of the total number of interesting prefixes (i.e., $|V|=T$). A function $W:[0,1] \to Z_+$ is defined that takes the value $|S|^l$ for all points in an interval corresponding to an interesting prefix of length l, and is zero elsewhere. Therefore, $$E_p[W(X)] = E_p[W(X)1_{\{X \in A\}}] \quad (1)$$

$$= \int_{-\infty}^{\infty} W(x) 1_{\{x \in A\}} p(x) dx$$

$$= \int_{x \in A} W(x) p(x) dx$$

$$= \sum_{v \in V} \left( \int_{x \in I_v} W(x) p(x) dx \right)$$

$$= \sum_{v \in V} \left( \int_{x \in I_v} |S|^{l_v} dx \right)$$

$$= \sum_{v \in V} \left( |S|^{l_v} \int_{x \in I_v} dx \right)$$

$$= \sum_{v \in V} |S|^{l_v} |S|^{-l_v} = |V| = T,$$

where the introduction of summation is possible because A is a finite union of disjoint $1_v$'s. Hence, $|v|$ is estimated by estimating $E_p[W(X)]$. As described earlier, the standard unbiased estimator for T would be $$\hat{T}_N = \frac{1}{N} \sum_{j=1}^{N} W(x_i),$$

where $X_1, X_2, \ldots, X_N$ are N random samples drawn from $[0,1]$ (or, equivalently, from $\Omega$) with density $p(x)$. However, since $W(X)$ is non-zero only on the rare set A, the variance of the estimator would be very large for any reasonable value of N. The problem is well-suited to the application of importance sampling techniques.

The following algorithm can be used to generate sample points in $[0,1]$ under the new measure.

IMP-Sampling-Algorithm

1. Initialization: Create a variable s of type state and initialize its static components with information about network connectivity and other properties of the initial setup of the system being modeled. Initialize $p_{curr}$ to 1, $1_{curr}$ to 0, and Attr to all possible packet attributes.

2. Pick a Transition. Generate the list L of available rules on all firewalls accessible from the current host (initially outside the network) that have not yet been traversed.

a. If L is not empty and Attr is not empty: (i) Assign a non-zero probability to each available rule using some heuristic, while ensuring that the probabilities sum up to 1. (ii) Pick one of the available rules based on the probabilities assigned above. This choice determines the current digit of the sample. Let q be the probability that was assigned to the chosen rule. (iii) Update (constrain) the Attr according to the rule chosen above (and the rules in the chosen firewall that did not match). (iv) Update $p_{curr}$ by multiplying its current value by q. (v.) Increment $1_{curr}$ by 1. (v) Check Attr to see if global policy is violated. If yes, then the process has reached a goal state, and exits with an indication of success, along with the current value of $p_{curr}$ and $1_{curr}$; otherwise, the process goes back to the beginning of step (ii.)

b. Else: Exit with an indication of failure because the current sample is not in A.

The above algorithm either returns an interesting prefix, along with the length of the prefix and the probability mass associated with the prefix under the new probability density, or indicates that the sample is not an interesting prefix. In case an interesting prefix is chosen, the returned probability mass is distributed uniformly in the interval corresponding to the valid prefix. A similar process is done in case of an indication of failure. Hence, at this stage a sample point exists in $[0,1]$. These considerations result in a new probability density function $p'(x)$. This is a valid change of measure, and the value of $p'(x)$ for $x \in I_v$ for some interesting prefix $v$ is $$p'(x) = \frac{p_v}{\text{size\_of\_I}_v} = \frac{p_v}{||S|^{-l_v}|} = \left(\prod_{j=1}^{l_v} q_i^v\right)|S|^{l_v}, \quad (2)$$

where $p_v$ is the probability of choosing the valid prefix $v$.

Despite the large numbers symbolically expressed above (e.g., $|S|^{l_v}$), the actual computations used in estimating $E_p[W(X)]$ can be done involving much smaller values, avoiding the risk of round-off and precision errors. It can be shown that the variance of the above estimator is proportional to $$\frac{1}{N}\left(\sum_{v \in V} \frac{1}{\prod_{j=1}^{l_v} q_i^v} - T^2\right). \quad (3)$$

It is obvious from the above equation that the variance changes greatly with the heuristic used to decide the $q_i^v$'s, i.e., the heuristic that chooses the next firewall rule to match at any stage of the sampling algorithm.

As systems being analyzed grow in size and sophistication, it is anticipated that the APT's statistical analysis mode will become increasingly relevant, providing the tool with superior scalability.

Experimental Evaluation

In this section, demonstrated is the efficacy of the APT 100 by using it to verify the access control policy implementation in a variety of settings. Test cases exist that are relatively small in size, such as a networking system typically found in a process control setting, and that show how the exhaustive analysis can be used to weed out misconfigurations of access control devices. This disclosure then demonstrates the APT's (100) scalability through the use of statistical analysis for analyzing a much larger system 10 that is beyond the capability of the exhaustive analysis. In all the experimental evaluations described below, APT's analysis engine was running on an AMD AthlonXP-64 3700+ machine with 2 GB of RAM.

Figure 8:
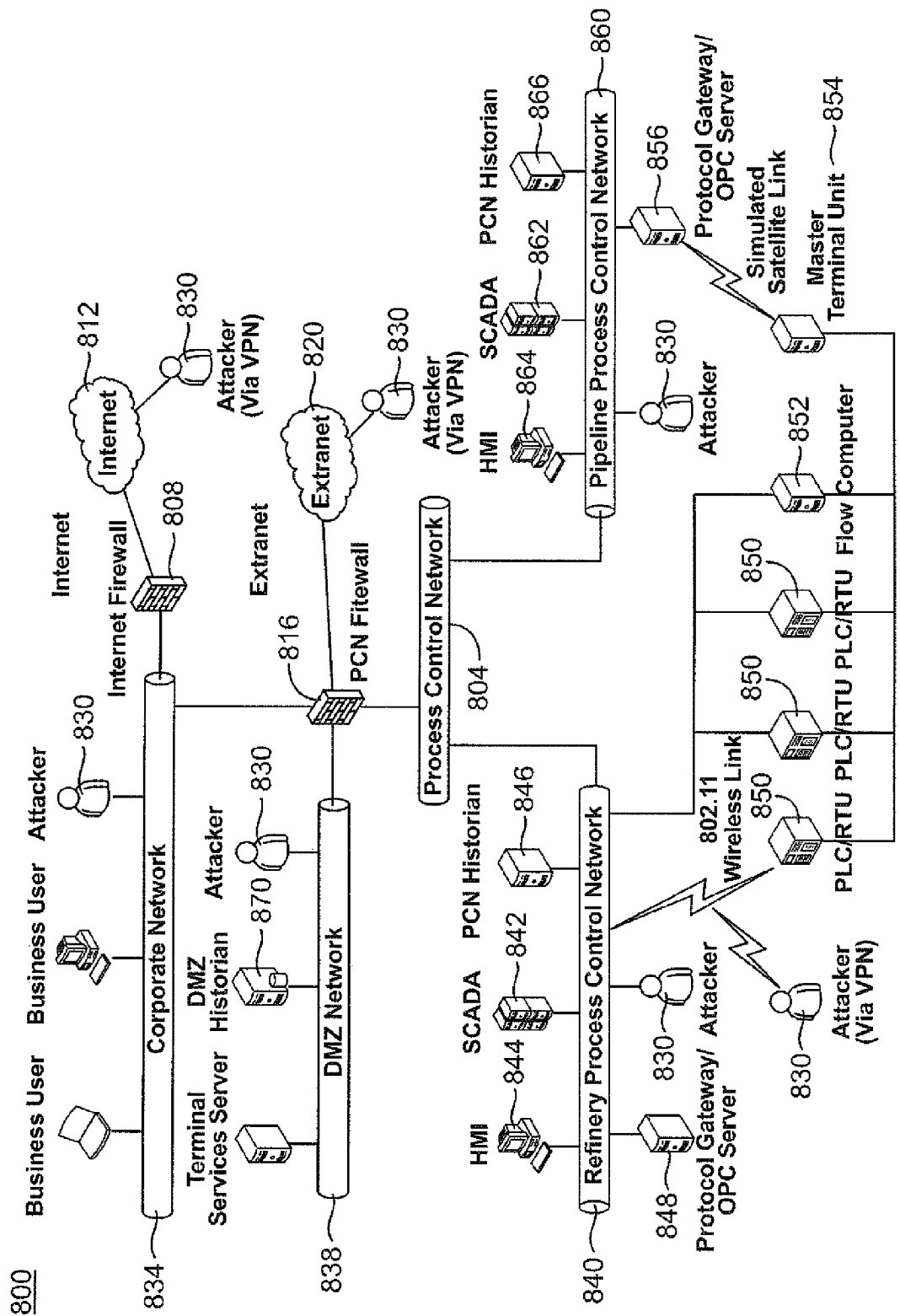
FIG. 8 shows an experimental test bed developed at the Sandia National Labs to represent a networking infrastructure at a typical Oil and Natural Gas (ONG) operator with an emphasis on the protection of the process control network (PCN).

FIG. 8 shows an experimental test bed developed at the Sandia National Labs to represent a networking infrastructure 800 at a typical Oil and Natural Gas (ONG) operator with an emphasis on the protection of a process control network (PCN) 804. The network contains two dedicated Cisco® PIX firewalls, each with 15 rules; one firewall 808 secures traffic to/from an internet 812 and the other, a PCN firewall 816 to secure traffic in/out of an extranet 820. Out of the 17 hosts in the network 800, five have host-based firewalls (iptables in Linux). All the hosts run the stock versions of the Windows® or Linux® operating systems (i.e., only discretionary access control mechanisms are present, and mandatory access control such as that provided by SELinux is not present). The rule-sets for the various firewalls were populated based on the settings found at a number of actual ONG sites.

A plurality of attackers 830 have potential access or starting points at their displayed locations. A corporate network 834 is located on the other side of the firewall 808 from the internet 812 and on the other side of the PCN firewall 816 from the extranet 820 and the PCN 804. A DMZ network 838 is located on the other side of the PCN firewall 816 from the corporate network 834, from the extranet 820, and from the PCN 804. The PCN 804 directly communicates with a refinery PCN 840, which connects to a supervisory control and data acquisition (SCADA) computer 842, a human machine interface (HMI) 844, a PCN Historian, 846, and a protocol gateway/open connectivity via open standards (OPC) data access server 848. The refinery PCN 840 also communicates wired or wirelessly to a plurality of programmable logic controllers (PLCs)/remote terminal units (RTUs) 850, to a flow computer 852, and to a master terminal unit 854. The master terminal unite 854 may also communicate with a protocol gateway/OPC data access server 856 over a simulated satellite link.

The PCN 804 directly communicates, or includes as a sub-network, a pipeline PCN 860. The pipeline PCN 860 directly communicates with a SCADA 862, an HMI 864, a PCN historian 866, and with the protocol gateway/OPC data access server 856. Note that the attackers 830 may access a number of points, whether from in front of or behind the firewalls 808, 816, wired or wirelessly. Again, this was an experimental ONG test bed, exemplary only of the types of topologies that the APT system 100 can analyze.

The global access constraints (GAPs) were defined, using APT's graphical front-end 110, to emphasize the tightly controlled isolation of the PCN 804 from the rest of the IT network 800. In particular, the GAPs specified that the hosts in the PCN 804 could access each other; however, only one (the PCN Historian 846, 866) could be accessed from outside the PCN 804. The PCN Historian 846, 866 could be accessed from (and only from) a "sysadmin" class user via a DMZ Historian 870 and from a "manager" class user from a host in the corporate network 834. APT's graphical front-end 110 facilitated easy specification of these constraints, which were subsequently translated into the underlying XML representation of the global policy.

The APT's (100) analysis engine 120, using the information about the network topology provided by the front-end 110, automatically and securely captured the configuration snapshot of the system network 10. An exhaustive analysis of the network system 10 was then performed. The analysis identified a total of 83 paths (sequences of firewall rules) in 10 seconds. The APT tool 100 was then instructed to perform a post-analysis on the results to further pinpoint the root causes of the violations. The post-analysis, based on frequency of occurrence in the list of violations, identified two rules, one in each of the two Cisco® firewalls 808, 816 acting in series, as the likely source of the violations. It further identified the attributes of the traffic that they are allowing to pass and also indicated the subset of the global access constraints that the traffic was violating.

Using the graphical front-end 110, it is possible to test hypothetical modifications to the highlighted rules and perform quick re-evaluation to discover the appropriate changes that resulted in zero violations of the policy specification (GAP). As is evident from this experiment, the exhaustive analysis functionality of the APT 100 was very useful for a reasonably small network. A complete analysis of the test bed network 800 indicated that the rule graph for the system had about 230,000 paths. Hence, the number of violations not only helps identify and correct misconfigurations, but also, when viewed in the context of the total number of ways traffic could traverse through the system 10, can serve as a quantitative measure of the system's security posture.

The APT 100 was also used to analyze the sample scripts used in the evaluation of the "Firewall Policy Advisor" by Al-Shaer and Hamed. All the misconfigurations in their sample scripts were captured. See E. Al-Shaer and H. Hamed, *Discovery of Policy Anomalies in Distributed Firewalls, Proceedings of the IEEE INFOCOM*, volume 4, pages 2605-2616, March 2004. Note that the APT's functionality is a superset, since the disclosed analysis is not limited to the analysis of relations between just two firewalls, and the APT system 100 can check for inconsistencies (due to the use of multi-dimensional interval trees) as well as explicit policy violations.

The scalability of the APT tool 100 was explored by testing it on the example setup (10) shown in FIG. 1. This test bed represents an intrusion-tolerant publish-subscribe system 10 developed as part of a DARPA-funded research effort. The system 10 contains more than 40 hosts, all with hardware NIC-based firewalls (more than 20 rules per firewall); 8 Cisco® PIX firewalls; and 29 of the hosts running SELinux, each with four (4) or more process domains. As can be imagined, the configuration of the large number of access control elements in this system in adherence to the global security policy is an extremely complicated task.

The global access constraints were set to emphasize tightly controlled access to the "System Manager" group of machines (the top row of four (4) machines in FIG. 1). These machines could access one another in very specific ways (to run Byzantine fault-tolerance algorithms) and could be accessed by only a very small set of other machines and only by processes from specific domains on those machines. Again, APT's graphical front-end 110 and underlying XML schema was used for the specification of the global access constraints.

A rule was then deliberately misconfigured in the hardware NIC-based firewall for one of the system manager machines, allowing for traffic that would result in the violation of the global policy. The exhaustive analysis was able to identify the resulting 263 violations and pinpoint the root cause in about 140 seconds (focusing primarily on the firewall rules, and not on the host-based access control mechanisms). Note that the total number of paths in the rule-graph for this system network 10 is huge, which explains the time taken by the analysis.

The problem was then made more complex by introducing problems in two firewalls; a Cisco® PIX dedicated firewall, and the hardware NIC-based firewall for one of the system manager machines, such that the violations only occur in the access decision sequences that include both the rules. The exhaustive analysis, again limited to firewall rules, identified 155 violations and the two modified rules in about 200 seconds. However, when the host-based access control mechanisms were also included in the analysis, the exhaustive analysis could not complete even after running for more than 3 hours, setting the stage for demonstrating increased scalability provided by the statistical analysis.

As described earlier, the APT's (100) statistical analysis can provide a sample set of violations and an estimate of the remainder. In this case, the APTO 100 uses the total number of violations as the quantitative estimate of the remainder. The biasing heuristic used for guiding importance sampling is based on shortest distance, i.e., it assigns higher weight to those access decisions that would guide the traffic closest (in network topology sense) to the hosts that are included in the specification of the global policy. Stopping criteria for the sampling was set at 500,000 samples or 5% relative error with 95% confidence, whichever was achieved first.

Statistical analysis on the test bed network 10 of FIG. 1 for the one-rule misconfiguration example above resulted in an answer in under 10 s (with the relative error convergence being the stopping criterion). The analysis estimated 255 violations, which is within 3% of the exact answer obtained from exhaustive analysis.

For the example with two misconfigured rules, the statistical analysis obtained an answer within 4% of the exact answer in about 10 s when only firewall rules are being analyzed, and about 25 s when host-based access control mechanisms are also being modeled.

Another example was tested where in addition to the two misconfigured rules, also introduced was a misconfiguration in the SELinux policy for the host with misconfigured host-based firewall, such that the global policy was now violated only when all three access control points were included. Again, the exhaustive analysis could not produce the complete list of violations after running for more than 3 hours, but the statistical analysis was able to provide an estimate with a 10% confidence interval (number of samples analyzed being the stopping criterion) in about 1 minute. Additional accuracy required a disproportionate increase in the time required for the analysis. Obtaining an estimate with a 5% confidence interval required the analysis to run for about 5 minutes.

Hence, one can observe that statistical analysis allows the APT 100 to analyze fairly complex systems within reasonably short periods of time. The tool's performance can likely be improved further with use of better biasing heuristics.

Deployment of a large number of distributed and layered access control mechanisms, such as firewalls, is the staple solution to the problem of enforcing security policy. Hence, it is preferable to ensure that all the access control mechanisms work collectively in harmony, and that their complex interactions do not mask subtle errors, introducing security vulnerabilities. The Access Policy Tool (APT) 100 provides a way for network system administrators and security experts to analyze their security policy implementation (configuration of various devices on their network) for conformance with a global security specification. The APT 100 features ease of information management through a graphical front-end 110, offline as well as online analysis of the compliance of a configuration with the desired or intended behavior, and scalability through the use of statistical techniques for the estimation of security posture. Those capabilities allow the gain of confidence in the implementation before actual deployment, making it possible to reason about policy at an increased level of abstraction, and permit system administrators to detect policy holes created during operational use of a system.

While specific embodiments and applications of various methods and systems for automatic verification of distributed and layered security policy implementations have been illustrated and described, it is to be understood that the disclosure claimed herein is not limited to the precise configuration and components disclosed. Various modifications, changes, and variations apparent to those of skill in the art may be made in the arrangement, operation, and details of the methods and systems disclosed.

The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a

The invention claimed is:

1. A computer-implemented method for analysis of distributed device rule-sets for compliance with global policies, the method executable by a computer having a processor and memory, comprising:
   receiving from an administrator a network topology with a plurality of reachable, intercommunicating elements and associated parameters required to secure the intercommunication with one or more access control elements of the network topology;
   establishing connections to the access control elements to capture a snapshot configuration of device rule-sets of the one or more access control elements;
   receiving from the administrator a set of global access constraints with reference to the plurality of access control elements;
   generating a multi-layered rule graph that captures network interconnectivity and data flow among the intercommunicating elements, where each of a plurality of nodes in the multi-layered rule graph represents a possible access decision by an access control element and paths of the multi-layered rule graph represent sequences of access decisions;
   conducting statistical analysis using model-based importance sampling of the multi-layered rule graph to determine violations by the device rule-sets that fail to comply with the set of global access constraints, the importance sampling quantitatively characterizing a level of compliance with the global access constraints without conducting analysis of all potential paths of the multi-layered rule graph; and
   providing results of the statistical analysis to the administrator through a graphical user interface (GUI) of the computer as the results are obtained so that the administrator can watch the progress of the analysis.

2. The method of claim 1, wherein the plurality of access control elements include network resources, and wherein enabling the administrator to specify a set of global access constraints comprises enabling the administrator to set a global access constraint for a group of the network resources.

3. The method of claim 1, further comprising:
   converting the device rule-sets of the one or more access control elements into a software language format;
   integrating the converted device rule-sets into a schema of the software language format for presentation to the administrator through the GUI; and
   integrating the administrator-specified global access constraints into the unified software language schema of the converted device rule-sets.

4. The method of claim 1, further comprising:
   enabling the administrator to abort the analysis; and
   enabling the administrator to perform a post-analysis on any partial or complete results throughout the analysis process.

5. The method of claim 4, wherein the post-analysis comprises:
   enabling the administrator to make hypothetical changes to the configuration of the device rule-sets for the plurality of access control elements; and
   enabling the administrator to select from at least one of exhaustive analysis and statistical analysis to analyze the changed configuration.

6. The method of claim 1, further comprising:
   checking, for consistency, the configuration represented by the snapshot of the plurality of access control elements together with the administrator-specified global access constraints.

7. The method of claim 1, further comprising:
   enabling the administrator to select exhaustive analysis;
   analyzing the multi-layered rule graph for the network topology in its entirety, considering each piece of configuration information collected; and
   producing a complete list of sequences of access decisions that indicates one or more paths taken through the multi-layered rule graph that violates a global access constraint.

8. The method of claim 7, wherein analyzing the multi-layered rule graph comprises:
   obtaining data structures and traffic attribute sets for the multi-layered rule graph that enable rapid traversal thereof, and algorithms to manipulate the data structures and attribute sets;
   using multi-dimensional interval trees to represent a network traffic component of the attribute sets;
   using custom set data structures to represent discrete components of the attribute sets;
   labeling a plurality of edges in the multi-layered rule graph, each label describing all traffic that is admitted by a rule corresponding to an edge source node and being analyzed by a rule corresponding to a terminal node; and
   using intelligent caching of results of analyses of sub-paths to minimize repeated computations.

9. The method of claim 1, wherein upon the administrator selecting the statistical analysis, the method further comprising:
   conducting repeated and random exploration of an extended version of the multi-layered rule graph to sample a number of paths to construct unbiased statistical measures of compliance;
   using the importance sampling to guide the random selection towards paths likely to be sources of violation of the global access constraints to reduce variance in the compliance measures; and
   calculating a desired set of metrics for traffic represented by each explored path.

10. The method of claim 9, where calculating a desired set of metrics includes calculating unbiased metrics estimators to remove a bias introduced by the importance sampling, further comprising:
    calculating a quantitative estimate of a remainder of the unexplored paths of the multi-layered rule graph; and
    analyzing the sampled paths of the multi-layered rule graph with the unbiased metrics estimators to form an estimate of the total number of paths therethrough that violate a specified global access constraint.

11. A system for analyzing distributed policy rule-sets for compliance with global policies, the system comprising:
    a graphical user interface (GUI) through which an administrator specifies a network topology with a plurality of reachable, intercommunicating elements and associated parameters required to secure the intercommunication with one or more access control elements of the network topology;
    an analysis engine in communication with the GUI and with the plurality of elements, the analysis engine including a processor operable to unify a plurality of device rule-sets associated with the one or more access control elements, and to convert the device rule-sets into a software language format presentable to the administrator through the GUI; and a memory to store an administrator-specified global access policy (GAP) that includes a plurality of global access constraints with reference to the plurality of elements, and to store the plurality of access policy rules;

wherein the processor is operable to:

generating a multi-layered rule graph that captures network interconnectivity and data flow among the intercommunicating elements, where each of a plurality of nodes in the multi-layered rule graph represents a possible access decision by an access control element and paths of the multi-layered rule graph represent sequences of access decisions;

conduct statistical analysis using model-based importance sampling of the multi-layered rule graph to determine violations by the device rule-sets that fail to comply with the GAP, the importance sampling quantitatively characterizing a level of compliance with the GAP without conducting analysis of all potential paths of the multi-layered rule graph; and provide results of the selected compliance analysis in real time to the GUI for viewing by the administrator as the results are obtained.

12. The system of claim 11, wherein the processor is operable to convert the GAP into the software language format and analyzes compliance of the one or more access control elements in accordance with the GAP.

13. The system of claim 11, wherein the processor is operable to select, on behalf of the advertiser, the at least one of exhaustive analysis and statistical analysis based on a determined level of resources required to conduct a full exhaustive analysis.

14. The system of claim 11, wherein the processor is operable to analyze the network topology to capture a snapshot configuration of the device rule-sets affiliated therewith, and wherein the processor is operable to convert the configuration into a schema of the software language for presentation through the GUI.

15. The system of claim 14, wherein the processor is operable to:

index and cache in the memory the snapshot configuration of the device rule-sets of the network topology; and while the analysis engine is disconnected from communication with the plurality of intercommunicating elements, to access the cached snapshot configuration of the converted device rule-sets to analyze compliance of the one or more access control elements in accordance with the GAP.

16. The system of claim 14, wherein the analysis engine comprises:

a consistency checker that, together with the processor, is operable to analyze the snapshot configuration of the device rule-sets based on the administrator-specified parameters, and return to the GUI a list of violations thereof with at least one global access constraint for reference by the administrator.

17. The system of claim 16, wherein the consistency checker generates the multi-layered rule graph that captures network interconnectivity and data flow among the plurality of intercommunicating elements, and wherein the processor is operable to integrate the GAP into the software schema for purposes of the compliance analysis, where each of a plurality of nodes in the multi-layered rule graph represents a possible access decision by an access control element.

18. The system of claim 11, wherein the processor is operable to:

enable the administrator, through the GUI, to abort the analysis; and enable the administrator to perform a post-analysis on any partial or complete results throughout the compliance analysis.

19. The system of claim 18, wherein the processor is operable to:

enable the administrator, through the GUI, to make hypothetical changes to the configuration of the device rule-sets for the plurality of elements; and enable the administrator to select from at least one of exhaustive analysis and statistical analysis to analyze the changed configuration.

20. The system of claim 17, wherein in response to the administrator selecting the exhaustive analysis, the processor operable to:

analyze the multi-layered rule graph for the network topology in its entirety, considering each piece of configuration information collected; and produce a complete list of sequences of access decisions that indicates one or more paths taken through the multi-layered rule graph that violates a global access constraint of the GAP by all traffic to which that sequence of access decisions applies.

21. The system of claim 20, wherein the processor is operable to:

obtain data structures and traffic attribute sets for the multi-layered rule graph that enable rapid traversal thereof, and algorithms to manipulate the data structures and attribute sets;

use multi-dimensional interval trees to represent a network traffic component of the attribute sets;

use custom set data structures to represent discrete components of the attribute sets;

label a plurality of edges in the multi-layered rule graph, each label describing all traffic that is admitted by a rule corresponding to an edge source node and being analyzed by a rule corresponding to a terminal node; and use intelligent caching of results of analyses of sub-paths to minimize repeated computations.

22. The system of claim 17, wherein in response to the administrator selecting the statistical analysis, the processor operable to:

conduct repeated and random exploration of an extended version of the multi-layered rule graph to sample a number of paths to construct unbiased statistical measures of compliance;

use importance sampling to guide the random selection towards paths likely to be sources of violation of the global access constraints to reduce variance in the compliance measures; and calculate a desired set of metrics for traffic represented by each explored path.

23. The system of claim 22, where to calculate a desired set of metrics the processor operable to calculate unbiased metrics estimators to remove a bias introduced by the importance sampling, where the processor is further operable to:

calculate a quantitative estimate of a remainder of the unexplored paths of the multi-layered rule graph; and analyze the sampled paths of the multi-layered rule graph with the unbiased metrics estimators to form an estimate of the total number of paths therethrough that violate a specified global access constraint of the GAP.

24. The system of claim 11, wherein the one or more access control elements comprise a plurality of firewalls.

25. A non-transitory computer readable medium including machine-readable instructions executable by a processor that causes a computer including the processor and memory to perform the operations of:
    enabling an administrator to specify a network topology with a plurality of reachable, intercommunicating elements and associated parameters required to secure the intercommunication with one or more access control elements of the network topology;
    establishing connections to the access control elements to capture a snapshot configuration of device rule-sets of the one or more access control elements;
    enabling the administrator to specify a set of global access constraints with reference to the plurality of access control elements;
    generating a multi-layered rule graph that captures network interconnectivity and data flow among the intercommunicating elements, where each of a plurality of nodes in the multi-layered rule graph represents a possible access decision by an access control element and paths of the multi-layered rule graph represent sequences of access decisions;
    conducting statistical analysis using model-based importance sampling of the multi-layered rule graph to determine violations by the device rule-sets that fail to comply with the set of global access constraints, the importance sampling quantitatively characterizing a level of compliance with the global access constraints without conducting analysis of all potential paths of the multi-layered rule graph; and
    providing results of the selected analysis to the administrator in real time through a graphical user interface (GUI) as the results are obtained so that the administrator can watch the progress of the analysis.

26. The computer readable medium of claim 25, wherein the plurality of access control elements include network resources, and wherein enabling the administrator to specify a set of global access constraints comprises enabling the administrator to set a global access constraint for a group of the network resources.

27. The computer readable medium of claim 25, further comprising performing the operation of:
    automatically selecting, on behalf of the advertiser, at least one of exhaustive analysis and statistical analysis based on a determined level of resources required to conduct a full exhaustive analysis.

28. A computer-implemented method for analysis of distributed device rule-sets for compliance with global policies, the method executable by a computer having a processor and memory, comprising:
    receiving from an administrator a network topology with a plurality of reachable, intercommunicating elements and associated parameters required to secure the intercommunication with one or more access control elements of the network topology;
    establishing connections to the access control elements to capture a snapshot configuration of device rule-sets of the one or more access control elements;
    receiving from the administrator a set of global access constraints with reference to the plurality of access control elements;
    generating a multi-layered rule graph that captures network interconnectivity and data flow among the intercommunicating elements, where each of a plurality of nodes in the multi-layered rule graph represents a possible access decision by an access control element and paths of the multi-layered rule graph represent sequences of access decisions;
    receiving a selection to perform model-based statistical analysis to determine violations by the device rule-sets that fail to comply with the set of global access constraints, where statistical analysis quantitatively characterizes a level of compliance without conducting analysis of all potential paths of the network topology;
    conducting the statistical analysis by selecting a probability distribution that biases sampling paths having device rule-sets that increase the likelihood of discovering violations of the global access constraints in the device rule-sets of sampled paths; and
    providing results of the statistical analysis to the administrator as the results are obtained.

29. The method of claim 28, where the snapshot configuration of the device rule-sets is received from the administrator.

30. The method of claim 28, where the statistical analysis further comprises:
    conducting repeated and random exploration of an extended version of the multi-layered rule graph to sample a number of paths to construct unbiased statistical measures of compliance;
    using importance sampling to guide the random selection towards paths likely to be sources of violation of the global access constraints to reduce variance in the compliance measure; and
    calculating a desired set of metrics for traffic represented by each explored path.

31. The method of claim 30, where calculating a desired set of metrics includes calculating unbiased metrics estimators to remove a bias introduced by the importance sampling, further comprising:
    calculating a quantitative estimate of a remainder of the unexplored paths of the multi-layered rule graph; and
    analyzing the sampled paths of the multi-layered rule graph with the unbiased metrics estimators to form an estimate of the total number of paths therethrough that violate a specified global access constraint.

32. The method of claim 28, further comprising:
    enabling the administrator to abort the analysis;
    enabling the administrator to perform a post-analysis on any partial or complete results throughout the analysis process;
    enabling the administrator to make hypothetical changes to the configuration of the device rule-sets for the plurality of access control elements; and
    enabling the administrator to conduct again the statistical analysis to analyze the changed configuration.

33. The method of claim 28, further comprising:
    presenting the results to the administrator through a graphical user interface (GUI) of the computer; and
    enabling the administrator, through the computer and while viewing the results in the GUI as the results are obtained, to manipulate, filter, or navigate through the results and to visualize a violation once the violation is detected, thereby enabling real-time diagnostic of one or more misconfigurations of a configuration of the device rule-set of one or more control access elements.

34. The method of claim 33, further comprising:
    accepting one or more proposed modifications to the device rule-sets; and
    sending the proposed modifications to an analysis engine of the computer to perform the statistical analysis again to verify whether the proposed modifications would resolve one or more of the misconfigurations.

* * * * *